United States Patent [19]

Familiar

[11] Patent Number: 5,752,027
[45] Date of Patent: May 12, 1998

[54] APPARATUS AND PROCESS FOR CREATING AND ACCESSING A DATABASE CENTRIC OBJECT

[75] Inventor: Robert F. Familiar, Sudbury, Mass.

[73] Assignee: Dun & Bradstreet Software Services, Inc., Atlanta, Ga.

[21] Appl. No.: 347,584

[22] Filed: Nov. 30, 1994

[51] Int. Cl.$^6$ ............................................. G06F 17/30
[52] U.S. Cl. ........................ 395/614; 395/611; 395/677
[58] Field of Search .............................. 395/600, 650, 395/611, 614, 677

[56] References Cited

U.S. PATENT DOCUMENTS 5,421,015  5/1995  Khoyi et al. ........................ 395/650
5,437,027  7/1995  Bannon et al. ...................... 395/600

FOREIGN PATENT DOCUMENTS 0 459 683  12/1991  European Pat. Off. .
0 474 340   3/1992  European Pat. Off. .

*Primary Examiner*—Thomas G. Black
*Assistant Examiner*—Cheryl R. Lewis
*Attorney, Agent, or Firm*—Troutman Sanders LLP; Joel S. Goldman; Scott M. Frank

[57] ABSTRACT

A new computerized object oriented technology is provided. The present invention introduces an apparatus and process for creating an object representative of a set of command interfaces for a database centric item, and an apparatus and process for interfacing the database centric object across a variety of computer applications. In a preferred embodiment, the present invention provides a three category structure to create and access the database centric objects. Each category contains classes which are used to define components (objects) corresponding to the database centric object. The objects further contain methods and properties for accessing the database centric item in response to requests from an application program.

52 Claims, 17 Drawing Sheets

INTERFACE OBJECT (225)

| INITIALIZATION PROPERTIES/METHODS (310) |
|---|
| ENUMERATION METHODS (320) |
| TRANSACTION METHODS (330) |
| STATUS METHODS (340) |
| ACCESS PROPERTIES/METHODS (350) |
| OPERATION METHODS (360) |

FIG. 3

NAME DATABASE TABLE (420)

| Field Name | Data Type | Description |
|---|---|---|
| first<br>last<br>id | string (20)<br>string (30)<br>integer | first name<br>last name<br>unique identifier |

FIG. 15

NUMBER DATABASE TABLE (420)

| Field Name | Data Type | Description |
|---|---|---|
| number<br>name_id | char (20)<br>integer | phone number<br>name table index |

FIG. 16

BUSINESS DIRECTORY DATABASE TABLE (420)

| Field Name | Data Type | Description |
|---|---|---|
| business<br>name<br>address<br>city<br>state<br>zip<br>voice<br>fax | char (30)<br>char (20)<br>char (255)<br>char (20)<br>char (2)<br>char (10)<br>char (15)<br>char (15) | category of business<br>company name<br>address<br>city<br>state<br>zip<br>voice phone number<br>fax phone number |

FIG. 17

APPARATUS AND PROCESS FOR CREATING AND ACCESSING A DATABASE CENTRIC OBJECT

BACKGROUND OF THE INVENTION

1. Technical Field

This invention relates generally to computerized object technology and, in particular, to an apparatus and process for creating an object representative of a database and for accessing the object across a variety of application programs.

2. Description of the Prior Art

In recent years application programs and operating systems for computer systems have become much more powerful and efficient. Specifically, users can now utilize computer systems to easily perform tasks that seemed close to impossible or took an extremely long time in the past.

A major reason for these innovations has been the use of "object oriented" technology. Prior art object oriented technology provides a means for items, such as documents, charts, images, vector graphics, voice annotations, video clips, tables and spreadsheets to be represented as objects. By representing these items as objects, users of computer systems have been more easily able to exchange, incorporate and process data among a variety of unrelated computer application programs.

Object oriented technology achieves these results by representing the items as objects with a common set of interfaces. Specifically, in prior art object oriented technology schemes, users need only be concerned with the common interfaces and the data sought to be accessed within the item.

One example of a common set of interfaces using object oriented technology is the Object Linking and Embedding (OLE) interface developed by Microsoft. The OLE interface not only provides a set of interfaces for representing an item as an object, but also provides an object oriented operating system for more efficient handling of the object.

Another aspect of the OLE interface, known as the OLE Automation Server, enables the user to define a set of command interfaces for a "document centric item". A document centric item is an item centered around a document file which is created by a word processor, spreadsheet, or other application program which creates a self-contained document file. The set of command interfaces is stored within an object, which may be accessed across a variety of computer application programs.

For example, a user who uses an application program to develop an item, such as a spreadsheet, can define a set of command interfaces, represent the set as an object and make the item represented by the object accessible to other computer application programs. To illustrate, a user of a word processor application program may easily invoke a command corresponding to one of the set of command interfaces represented by a spreadsheet object and sort a range of cells within the spreadsheet. This may be accomplished with the word processor application program needing only the set of command interfaces to access the spreadsheet data. Further, this may be accomplished without the user having an extensive knowledge of the particular application program used to create the item.

This prior art object oriented technology has lead to significant improvements in the efficiency and power of computer systems. As described above, items, such as documents, charts, images, vector graphics, voice annotations, video clips, spreadsheets and other self-contained files may be represented as objects. By representing these items as objects, easy access to data within items from a variety of application programs may be achieved. Further, the OLE Automation Server has taken object oriented technology a step further by representing document centric items with a set of command interfaces stored within an object.

Nonetheless, a significant drawback associated with this prior art object oriented technology is that a "database centric items (e.g., a non-self-contained item such as a database, which may include files containing pointers to other associated files within the item) cannot be represented by a set of command interfaces stored within an object. Therefore, with prior art object oriented technology a database centric item cannot be easily accessed across a variety of computer application programs.

The above illustrates just some of the problems associated with the prior art technology. These drawbacks and other shortcomings are effectively overcome by the present invention, as described in further detail below.

SUMMARY OF THE INVENTION

In accordance with the teachings of the present invention, a new computerized object oriented technology is provided. The present invention introduces an apparatus and process for creating an object representative of a set of command interfaces for a database centric item, and an apparatus and process for interfacing the database centric object across a variety of computer applications.

The present invention improves on prior art object oriented technology in that it allows for the creation of a database centric object. Further, the present invention provides a common interface for the object to be accessed across a variety of computer applications. In a preferred embodiment, the present invention provides a three category, five component structure which may be used in conjunction with OLE Automation Server technology to create and access the database centric objects. Each category contains classes which are used to define objects corresponding to the database centric object. The three categories of the structure of the present invention are the Infrastructure category, the Dispatch category and the Database category.

The Infrastructure category contains classes which define objects which initialize/de-initialize the OLE Automation Server and create objects within the Dispatch category. The Dispatch category contains classes which define objects which expose the set of command interfaces (methods and properties) corresponding to the database centric item. Finally, the Database category contains classes which define objects which allow for connectivity and querying of the database centric item.

The Infrastructure category includes an Application class and a ClassFactory class. The Application class defines an object which initializes and de-initializes the OLE Automation Server and creates, maintains and destroys objects defined by classes within the Database category which provide a means for connecting to the database centric item. The ClassFactory class defines an object which includes a method for creating an object defined by an Interface class within the Dispatch category.

The Dispatch category contains the Interface class which defines an object for exposing the set of command interfaces (methods and properties) for accessing the database centric item. Each Interface object may expose one or more command interface from each of the following six categories:

Initialization Properties/Methods, Enumeration Methods, Transaction Methods, Status Methods, Access Properties/Methods and Operation Methods.

The Initialization Properties/Methods provide a means for a user to perform an initial query on the database centric item and perform any other initialization tasks on the database centric item. The Enumeration Methods provide a means for the user to traverse the records of the database centric item. The Transaction Methods provide a means for the user to create, edit and delete the records in the database centric item. The Status Methods provide a means for the user to determine the capabilities of the underlying database centric item, such as whether the records are read only or read/write. The Access Properties/Methods provide a means for the user to access the data of a particular field of a record in the database centric item. Finally, the Operation Methods provide a means for the user to define additional command interfaces for accessing the database centric item.

The Database category includes a Database class and a Recordset class for defining corresponding objects. The Database class defines an object which provides a means for connecting to and opening/closing a database centric item. This object may also be connected to an interface which communicates across a variety of databases, such as those in the following format: dBase, Access, Sybase, Oracle, dB2, and Paradox. One such interface in which the object defined by the Database class may be connected is known as the Open Database Connectivity (ODBC) interface developed by Microsoft.

The Recordset class defines an object which performs an initial query on the database centric item immediately prior to when the object defined by the Interface class exposes the methods and properties in order to access the database centric item. The initial query by the object defined by the Recordset class typically includes an initial join, filter and parameterization of the database centric item.

Accordingly, the present invention improves on prior art object oriented technology, such as the OLE Automation Server, to provide an apparatus and process for creating and accessing an object representative of a set of command interfaces for a database centric item. The aforementioned and other aspects of the present invention are described in the detailed description and attached illustrations which follow.

BRIEF DESCRIPTION OF THE DRAWINGS

FIG. 3 depicts methods and properties of an Interface Object, which is a component of a database centric object, in a preferred embodiment of the present invention.

FIG. 15 depicts a Name database table as part of a Phone Book database in an illustrative example of an object representation of the Phone Book database in a preferred embodiment of the present invention.

FIG. 16 depicts a Number database table as part of a Phone Book database table as part of a Phone Book database in an illustrative example of an object representation of the Phone Book database in a preferred embodiment of the present invention.

FIG. 17 depicts a Business Directory database table as part of a Phone Book database in an illustrative example of an object representation of the Phone Book database in a preferred embodiment of the present invention.

DETAILED DESCRIPTION OF A PREFERRED EMBODIMENT OF THE INVENTION

Figure 1:
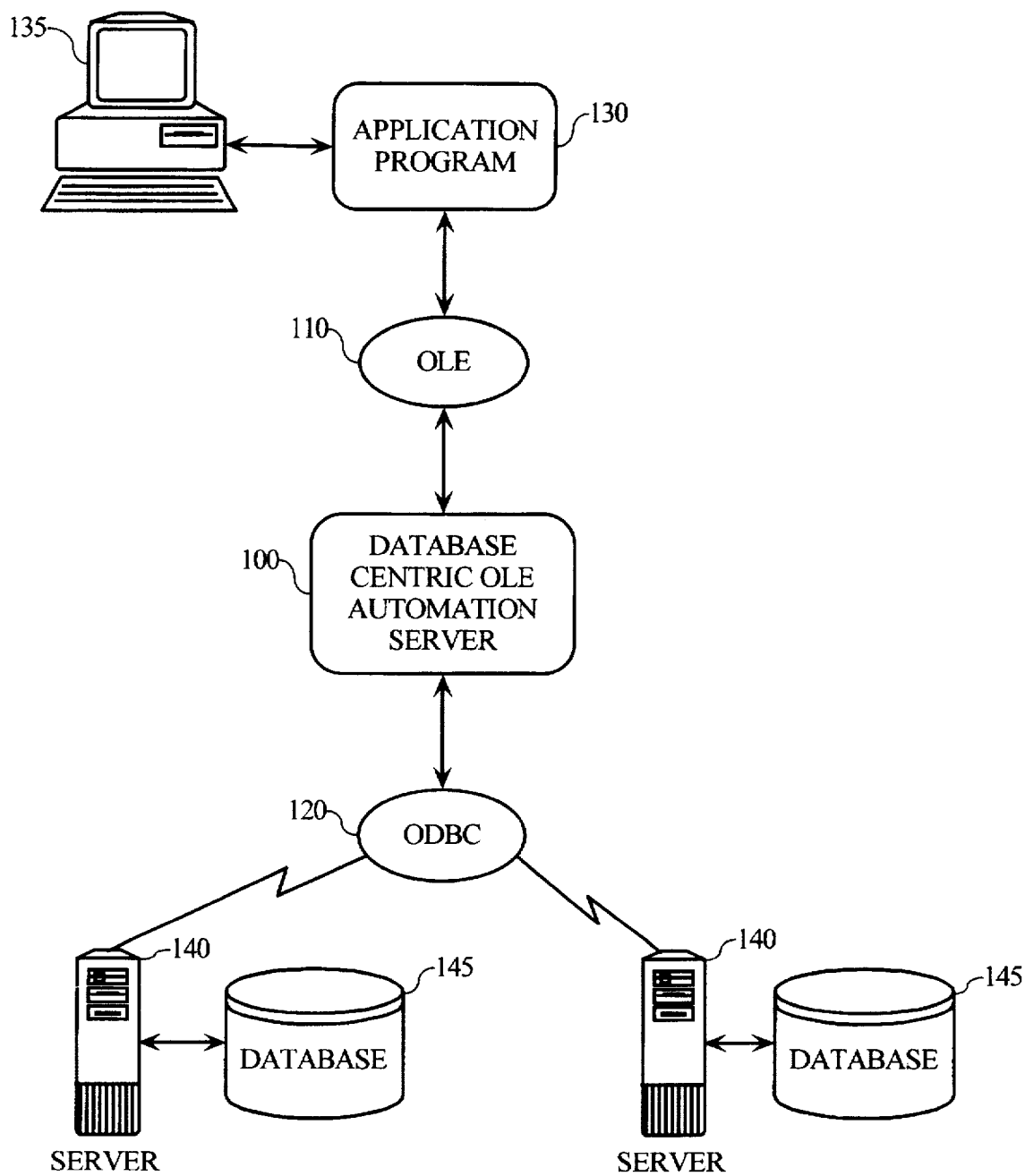
FIG. 1 depicts a diagram of the present invention implemented in a client/server network.

FIG. 1 illustrates a preferred computer system for use of the present invention. Specifically, the present invention includes a Database Centric OLE Automation Server (Automation Server) 100 interfaced between an object oriented operating system, such as an OLE interface 110, and an interface which communicates with a variety of database 145 types, such as an ODBC interface 120.

In the preferred embodiment, the computer system in which the present invention is implemented is a client/server network. For this embodiment, the OLE interface 110, the Automation Server 100 and the ODBC interface 120 are preferably located at the client 135.

In this embodiment, the OLE interface 110 interacts with application programs 130 at the client 135, also known as the enduser workstation. In one embodiment, the OLE interface may comprise OLE 2.0 available from Microsoft Corp. The client may be an IBM compatible PC or an equivalent running MS-DOS and Microsoft Windows or their equivalent. The application programs 130 may be written in any language which supports prior art OLE Automation Server technology, such as C, C++, Visual Basic, etc.

For the client/server network embodiment, the ODBC interface 120, which is a uniform database interface such as that developed by Microsoft, interacts with a variety of database 145 types stored on one or more server 140. The ODBC interface 120 provides a means for communicating with the different types of databases, such as SyBase, Oracle, Access, DB2, Dbase, Paradox, etc. at one time. Of course, as discussed in the Summary of the Invention, the Automation Server 100 may communicate directly with a database, without the ODBC interface 120, when only one type of database is being used.

Set forth below is a description of the computer software for implementing a presently preferred embodiment of the present invention. As one of ordinary skill in the art would readily understand and appreciate, the following is merely one mode for implementing the invention and many equivalent ways exist to achieve the same functions and results of the invention.

Figure 2:
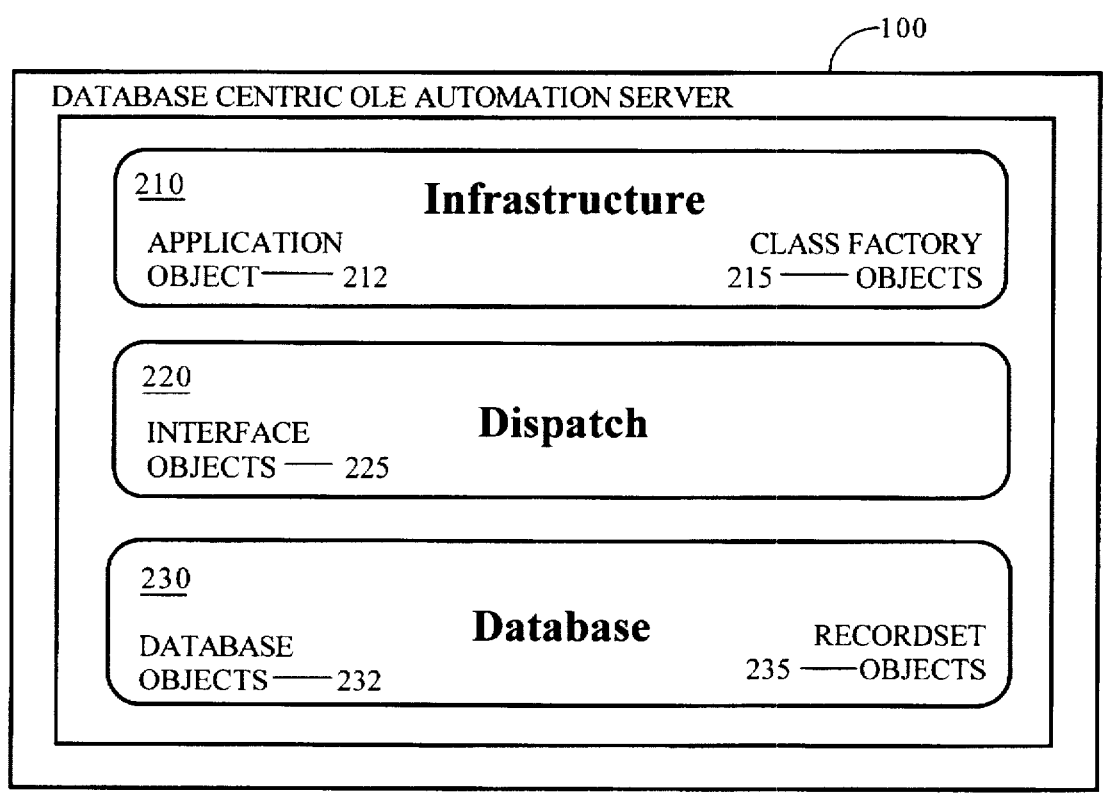
FIG. 2 depicts the architecture of an Automation Server that contains a database centric object, where the Automation Server is divided into three categories and five components in a preferred embodiment of the present invention.

Referring to FIG. 2, the Automation Server 100 architecture includes a three category, five component structure, where each category contains at least one component (also referred to herein as an "object"). The three categories are the Infrastructure category 210, the Dispatch category 220, and the Database category 230.

Though one of ordinary skill in the art could readily implement the objects of these categories, Visual C++ available from Microsoft contains a class library of classes which define objects. By using the classes in the class library to define the objects, each of the objects may be created at a later time.

The Infrastructure category 210 contains an Application object 212 and at least one ClassFactory object 215. The Application object 212 initializes/de-initializes the Automation Server 100 with the OLE interface 110, creates the ClassFactory object 215, creates, maintains and destroys some objects in the Database category 230, and requests the ClassFactory object 215 to register itself with the OLE interface 110. The ClassFactory object 215 creates the object of the Dispatch category 220 for exposing the set of command interfaces (methods and properties) corresponding to the database 145.

The Dispatch category 220 contains at least one Interface object 225, which, as described above, stores and exposes the set of command interfaces (methods and properties) for accessing the database 145. As shown in FIG. 3, each Interface object 225 may expose one or more command interface from each of the following categories: Initialization Methods 310, Enumeration Methods 320, Transaction Methods 330, Status Methods 340, Access Properties/ Methods 350, and Operation Methods 360.

The Initialization Methods 310 provide a means to perform an initial query on the database 145 and perform any other initialization tasks on the database 145. Each Interface object 225 exposes Initialization Properties/Methods 310 so that one answer set may be enumerated from the database 145 for each initial query. Each Interface object 225 exposes one Initialization Method 310 and zero or more Initializatioin Properties 310. Further, the Initialization Method 310 is called prior to calling any other methods of the Interface object 225 so that the other methods will have an answer set to manipulate.

The Enumeration Methods 320 provide a means to traverse the records of the answer set after the database 145 has been initialized. Examples of Enumeration Methods 320 include, but are not limited to: go to the first record, go to the last record, move to the next record, move to the previous record, move to a specific record, skip a set of records, return the number of records, return the current record number, verify positioning at the beginning of a record set and verify positioning at the end of a record set.

The Transaction Methods 330 provide a means to create, edit and delete records in an answer set. Examples of Transaction Methods 330 include, but are not limited to: create a new blank record, delete the current record, save modifications to the current record, requery the answer set, cancel an asynchronous operation, start a transaction, commit the transaction, and roll back the transaction.

The Status Methods 340 provide a means to determine the capabilities of the underlying database 145 in which the answer set has been queried. For example, the Status Methods 340 may determine whether the records are read only, can be added, can be edited and can be deleted. Further, a Status Method 340 may determine whether the database 145 supports transactions.

The Access Properties/Methods 350 provide a means to access data in connection with one or more particular fields of a record in the answer set enumerated by the Initialization Method 310. For example, if an Interface object 225 corresponds to a database 145 containing the "first_name", "last_name", and "mid_initial" fields, then the Interface object 225 may expose a "First Name", "Last Name" and "Middle Initial" properties. Further, in order to obtain and input data in these fields, various methods may be used. The properties, thus, act as a criteria for allowing the methods to obtain or input the data in the "first_name", "last_ name" and "mid_initial" fields.

The Operation Methods 360 provide a means to define additional functions in connection with the database 145. For example, a user may wish to define an import and/or export method to transfer data to and from other databases. Nonetheless, though each Interface object has at least one Initialization Method 310, Enumeration Method 320, Transaction Method 330, Status Method 340 and Access Property/ Method 350, the Operation Method is optional in a preferred embodiment of the present invention.

Since all Interface objects 225 in the Dispatch category 220 must expose an Enumeration Method 320, Transaction Method 330 and Status Method 340, a preferred embodiment of the present invention centralizes each of these methods in a common Application Programming Interface (API) class called CCommon API. The common API may be stored with other classes written in the same language, such as C++, in a class library. Examples of other classes include an enumeration API for a scrollable database class and an enumeration API for a non-scrollable database class. Both of these enumeration classes are derived from an enumeration API base class. A common API uses one of the two derived enumeration API classes to implement the appropriate interface enumeration for the database 145. Therefore, by making all these classes available in a class library, a user may more easily define the database centric object.

Referring back to FIG. 2, the Database category 230 contains at least one Database object 232 and at least one Recordset object 235. The Database object 232 connects the Automation Server 100 to the database 145 and opens/closes the database 145. As described above, in a preferred embodiment, the connection from the Database object 232 to the database 145 is made via an Open Database Connectivity (ODBC) interface 120, which is capable of communicating with a variety of database 145 types (e.g., Sybase, Oracle, dBase). The ODBC interface 120 may be especially useful in accessing a relational database 145.

The Recordset object 235 of the Database category 230 performs an initial query on the database 145 immediately prior to the Interface object 225 of the Dispatch category 220 exposing methods and properties to the database 145. The initial query by the Recordset object 235 typically includes an initial join, filter and parameterization of the database 145. The Interface object 225 then exposes the set of common interfaces (methods and properties) for obtaining and manipulating an answer set obtained from the database 145.

Figure 4:
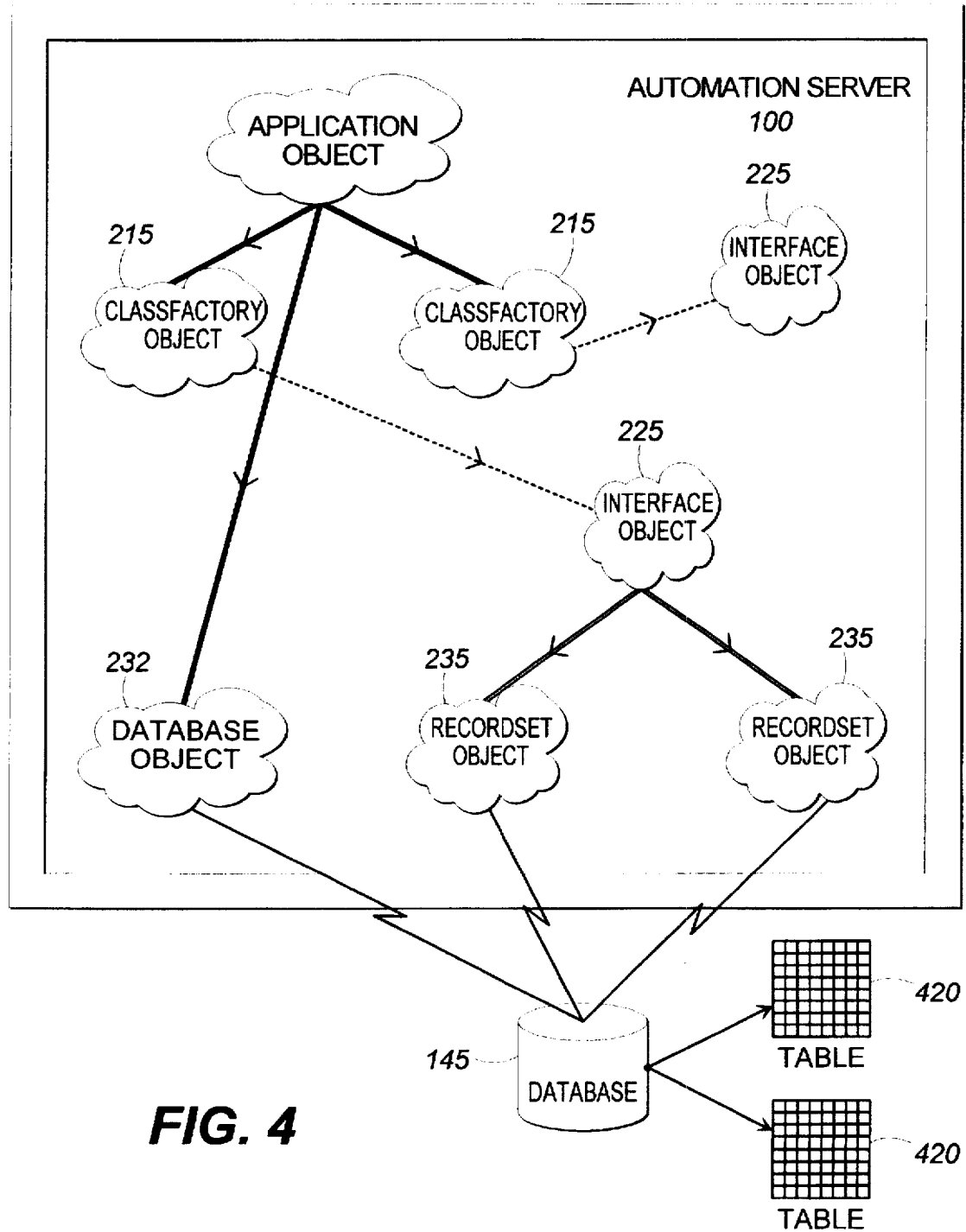
FIG. 4 depicts the relationship between the different components of a database object, as well as their relationship with a database, in a preferred embodiment of the present invention.

FIG. 4 illustrates the above-described relationships between the objects of the Automation Server 100. When requested by an application program 130 via the OLE interface 110, the Automation Server 100 creates the Application object 212 to begin the database centric object representation process. The Application object 212 for a particular Automation Server 100 then creates the ClassFactory object(s) 215 and Database object(s) 232 for the Automation Server 100. Further, the Application object requests the ClassFactory object 215 to register itself with the OLE interface 110. The solid lines between the Application object 212 and both the ClassFactory object 215 and Database object 232 indicate that the Application object 212 keeps pointers to the ClassFactory object 215 and the Database object 232 it creates.

Each ClassFactory object 215, in turn, creates an Interface object 225, which exposes the methods and properties for interfacing with a particular database 145. The dotted line between the ClassFactory object 215 and the Interface object 225 indicates that the ClassFactory object 215 does not keep any information in connection with the Interface object 225 (e.g., a pointer) after the Interface object 225 is created.

The Interface object 225 then creates one or more Recordset object 235. The solid lines between the Interface object 225 and Recordset object(s) 235 indicate that the Interface object keeps pointers to the Recordset object 235 it creates.

The Database object 232 then opens the connection with the database 145 composed of table(s) 420 and the like with or without the ODBC interface 120 depending on the mix of database 145 types. Further, the Recordset object(s) 235 perform the initial query of the database 145 to join, filter and parameterize the database 145. Finally, the Interface object 225 exposes the methods and properties for manipulating the answer set from the database 145 queried by the Recordset object 235.

Figure 5:
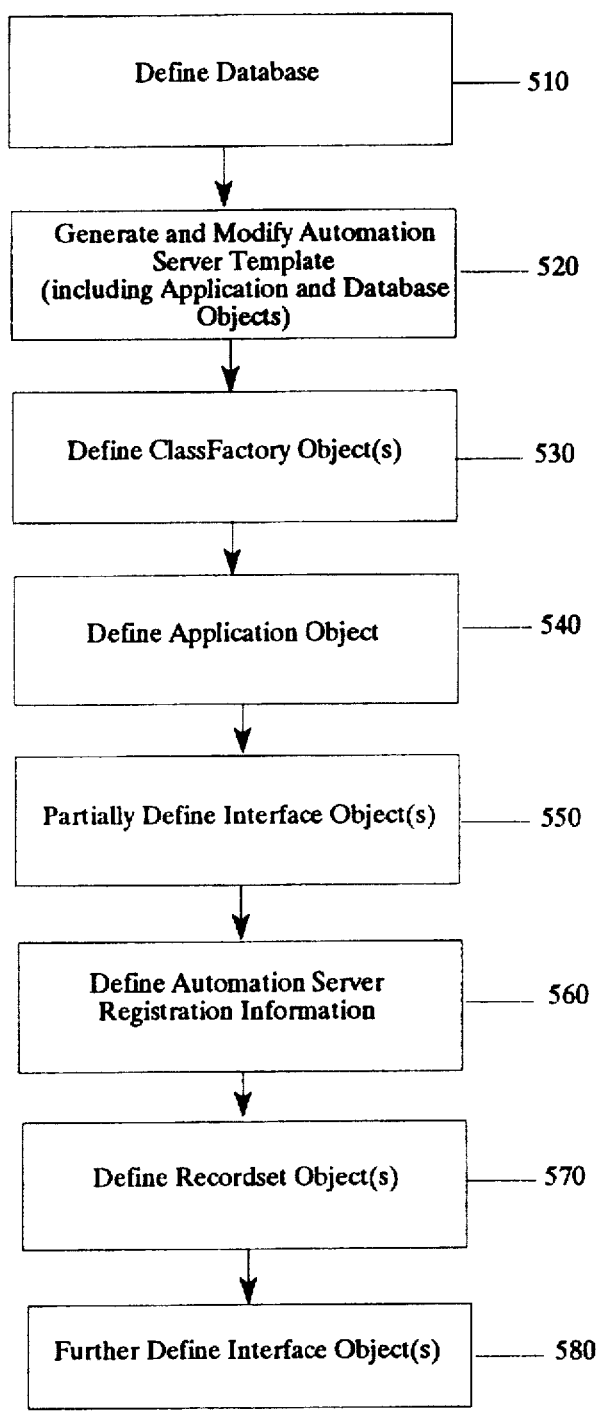
FIG. 5 depicts a flow diagram of a preferred embodiment for defining a database and a database centric object in a preferred embodiment of the present invention.

FIG. 5 illustrates the implementation of the Automation Server 100 of the present invention. In a preferred embodiment, the Automation Server is implemented with Visual C++ available from Microsoft.

The process begins at step 510, where a user of the present invention defines the database 145. As described above, in a preferred embodiment, the database 145 type, such as Sybase, Oracle and Access, is preferably accessible through the ODBC interface 120.

At step 520, the user generates a template for the Automation Server 100 and modifies the template for database centric use. In a preferred embodiment, the user utilizes the AppWizard feature of Visual C++ to generate an Automation Server 100 template for a prior art document centric object. In doing so, an Application class for an Application object 212 is generated, and a predefined Database class for a Database object 232 is pulled in from the Visual C++ library of classes.

These prior art templates of the Automation Server 100 include a Document/View feature to manipulate the document centric objects with a user interface. However, since the present invention is not for use with prior art document centric objects, the Document/View portion of the template should be removed. Specifically, all references to the Document/View class headers and sources should be removed. In doing so, the bare minimum framework necessary to implement the Automation Server 100 of the present invention is exposed.

During generation of the Automation Server 100 template, Visual C++ also generates a Class ID, also referred to as GUID, which is a 128 byte identifier associated with a document centric object. Therefore, since the template is not for use with a document centric object, the Class ID should also be removed.

At step 530, the user defines the ClassFactory object(s) 215 with a ClassFactory class. The user should define a ClassFactory object 215 for each top level Interface object 225 of the Automation Server 100 which the user wishes to expose.

For the purposes of the present invention, a top level Interface object 225 is defined as an Interface object 225 which may be accessed directly by an application program 130 via an OLE interface 110. On the other hand, a non-top level Interface object 225 is defined as an Interface object 225 which may be accessed by an application program 130 via an OLE Interface 110 only by using a top level Interface object 225 to reference and access it.

An example of a Visual C++ command for defining a ClassFactory object 215 is "Class C[object name]CF: public COleObjectFactory." In defining each ClassFactory object 215, a Class ID (or GUID) may be assigned for each ClassFactory object 215 or a place holder may be inserted into the definition for later insertion of a Class ID.

At step 540, the user defines the Application object 212 for the Automation Server 100 with an Application class that was generated with the Automation Server 100 template. An example of a Visual C++ command for generating an Application object 212 is "Class C[object name]App: public CWinApp". The Application class is modified to define the objects associated with the Application object 212. Specifically, the Application class is modified to define the Database object(s) 232 and ClassFactory object(s) 215 associated with the Application object 212.

The Application class is also modified to initialize and exit the Automation Server 100. For example, initializing commands, represented as "InitInstance( )" in Visual C++, may call on OLE API (Application Programming Interface) to get the OLE interface 110 up and running, request a Database object 232 to open a connection with a database 145, and request a ClassFactory object 215 to register itself with the OLE interface 110. Examples of exit commands, represented as "ExitInstance( )" in Visual C++, may include requesting the Database object 232 to close a database 145 connection.

At step 550, the user partially defines the Interface object(s) 225 for the Automation Server 100 with an Interface class. The Interface class, including certain methods and properties, for the Interface object 225 may be easily generated for later defining with the Class Wizard feature of Visual C++. The primary command for this Interface class is "Class C[object name]: public CCmdTarget".

Using Class Wizard or simply adding each one individually, the user may define the Initialization Properties/Methods 310, Enumeration Methods 320, Transaction Methods 330 and Status Methods 340 of the Interface object(s) 225. The following is an example of a Visual C++ command representative of one such method. For the Initialization Method 310, "BOOL Query (short nQueryId"")" is representative of the method for performing the "initial query" and any other initialization tasks.

Examples of Enumeration Methods 320 include: "BOOL MoveFirst( )" representative of the "go to the first record" method; "BOOL MoveLast ( )" representative of the "go to the last record" method "BOOL MoveNext( )" representative of the "move to the next record" method; BOOL MovePrevious( ) representative of the "move to the previous record" method; "BOOL MoveTo(long index)" representative of the "move to the specific record" method where "index" points to the target record; "BOOL Skip(long amount)" representative of the "skip a set of records" method where "amount" points to the number of records to skip; "long Count( )" representative of the "return the number of records" method; "long CurrentRecord ( )" representative of the "return the current record" method; "BOOL First( )" representative of the "verification that the object is at the beginning of the answer set" method; and "BOOL Last( )" representative of the "verification that the object is at the end of the answer set" method.

Examples of the Transaction Methods 330 include: "BOOL New( )" representative of the "create a new blank record" method; "BOOL Delete( )" representative of the "delete the current record" method; "BOOL Update( )" representative of the "save the modifications to the current record" method; "BOOL Refresh( )" representative of the "re-query the record set to go to the first record" method; "BOOL Cancel( )" representative of the "cancel an asynchronous operation" method; "BOOL BeginTransaction( )" representative of the "start a transaction" method; "BOOL CommitTransaction( )" representative of the "commit the transaction" method; and "BOOL Rollback( )" representative of the "roll back the transaction" method.

Examples of the Status Methods 340 include: "BOOL ReadOnly( )" representative of the "records are read only method"; "BOOL CanAppend( )" representative of the "records can be added" method; "BOOL CanUpdate( )" representative of the "records can be edited" method; "BOOL CanDelete( )" representative of the "records can be deleted" method; "BOOL CanTransact( )" representative of the "database supports transactions" method; and "short State( )" representative of the "query state of the object" method.

At step 560, the user defines the registration information of the Automation Server 100. Specifically, the user includes information associated with all objects found in the Automation Server 100 and the Class ID for each object. This registration information will be used later when installing the Automation Server 100 on a user's computer system.

At step 570, the user defines the Recordset object(s) 235 for the Automation Server 100 with a Recordset class. The Class Wizard feature of Visual C++ may be used to easily generate, define and map the Recordset classes. In using Class Wizard, the user may need to add further parameterization members for querying. An example of a Visual C++ command for implementing a Recordset object(s) 235 is "Class C[object name]Set : public CRecordset".

At step 580, the user further defines the Interface object(s) 225. Particularly, the user defines the Access Properties/Methods 350 of the Interface object(s) 225 for each field in the Recordset object 235 the user may wish to expose.

For example, when accessing a database 145 which includes records with a "First Name" field, Visual C++ commands for implementing the Access Properties/Methods 350 might include "BSTR GetFirstName( )" and "void SetFirstName(lpszNewValue)". The "BSTR GetFirstName( )" command is a method which would allow a user to "obtain a first name using the first name property from the first name field of a Recordset object 235. On the other hand, the "void SetFirstName(lpszNewValue)" is a method which would allow a user to input a first name using the first name property into the first name field of a Recordset object 235. Of course, this is merely an example, and other Access Properties/Methods 350 for accessing other databases 145 containing other field names may be readily created.

The user may also define any Operation Methods 360 at this time. For example, Operation Methods 360 may be defined for importing or exporting data, as well as accessing a non-top level Interface object 225.

Figure 6:
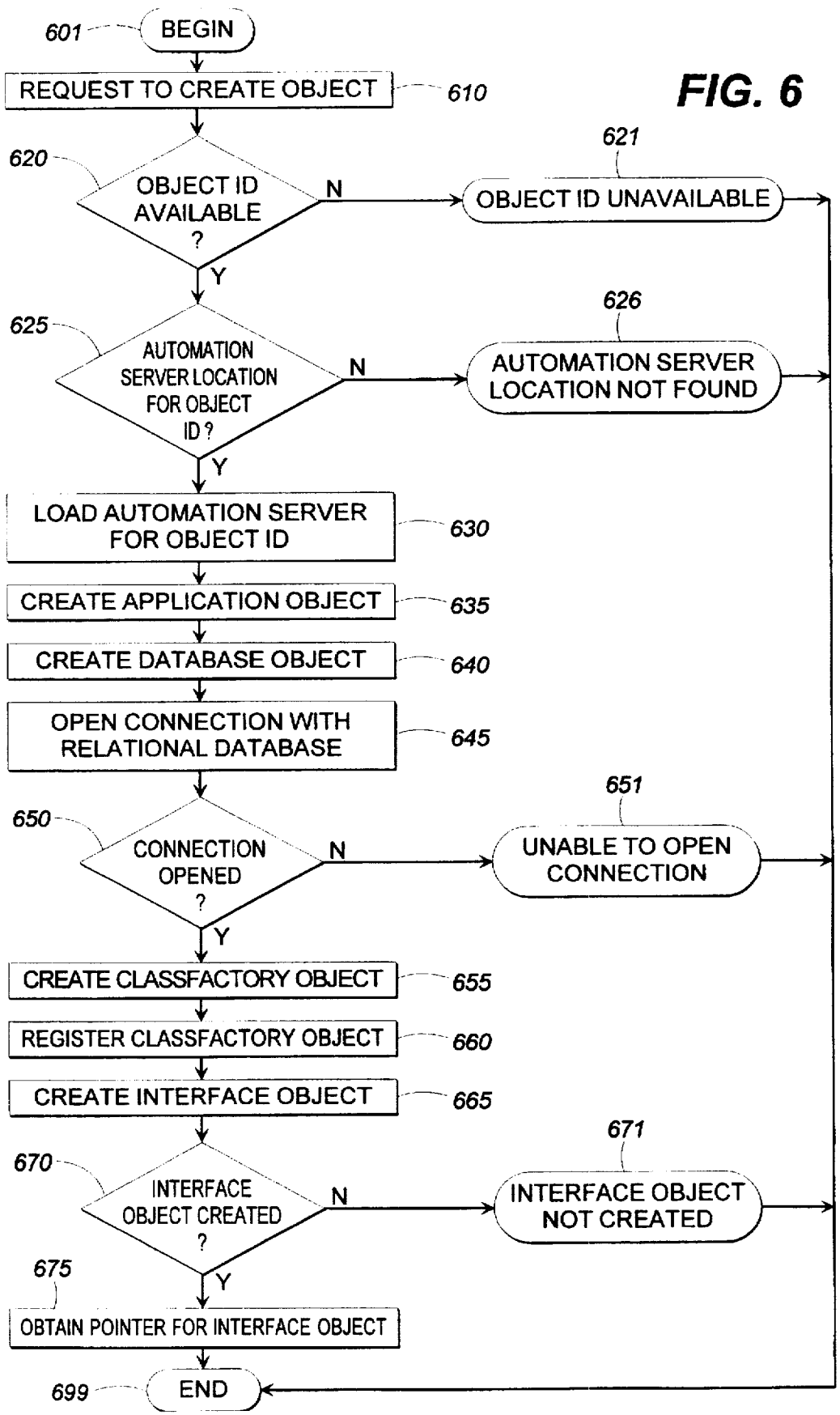
FIG. 6 depicts a flow diagram for creating an object representative of a database in a preferred embodiment of the present invention.

FIG. 6 illustrates the creation of a database centric object by the user. The process begins at step 601, where the application program 130 receives an "object creation" command from a user via an enduser workstation 135. At step 610, the application program 130 then requests the OLE interface 110 to create the particular object.

At step 620, the OLE interface 110 then accesses a Registration Database to determine whether the particular object is available on the user's system. The Registration Database is part of the an operating system which is used in conjunction with the interface 110 and is set up when installed on the user's computer system.

Information in connection with the Automation Server 100 is then stored in the Registration Database when the Automation Server 100 is installed on the user's system. This information includes a unique 128 byte identifier for each database centric object installed with the Automation Server 100. This unique identifier is referred to as the Class ID (GUID).

If the particular object is not available in the Registration Database, then the OLE interface 110 proceeds to step 621 where it returns a "failed" signal to the application program 130. At step 699, the application program 130 then notifies the user of the failure. However, if the particular object is located in the Registration Database, then the OLE interface 110 proceeds to step 625.

At step 625, the OLE interface 110 uses the Registration Database to determine the location of the Automation Server 100 for the particular database centric object. If the OLE interface 110 is unable to locate the Automation Server 100 for the object, then the OLE interface proceeds to step 626 where it returns a "failed" signal to the application program 130. At step 699, the application program 130 then notifies the user of the failure. However, if the Automation Server 100 for the particular object is located, then the OLE interface 110 proceeds to step 630.

At step 630, the OLE interface 110 loads the Automation Server 100 for the particular database centric object from storage into current memory. The OLE interface 110 then requests the Automation Server 100 to create the particular database centric object.

The Automation Server 100 then performs a series of initialization tasks. Specifically, at step 635, the Automation Server 100 creates the Application object 212. Further, at step 640, the Application object 212 creates the Database object 232. At step 645, the Database object 232 then opens a connection with the particular database 145.

At step 650, the Database object 232 verifies that the connection with the database 145 has been opened. If the Database object 232 is unable to open a connection, then the Database object 232 proceeds to step 651.

At step 651, the Database object 232 returns a "failed" signal to the OLE interface 110, which forwards the signal to the application program 130. At step 699, the application program 130 then notifies the user of the failure. However, if the connection is opened by the Database object 232, then the Automation Server 100 proceeds to step 655.

At step 655, the Application object 212 of the Automation Server 100 continues the initialization process by creating a ClassFactory object 215 for the database centric object. At step 660, the Application object 212 then requests the ClassFactory object 215 to register itself with the OLE interface 110. The Application object 212 of the Automation Server 100 then returns control to the OLE interface 110 at step 665.

At step 665, the OLE interface 110 requests the ClassFactory object 215 of the Automation Server 100 to create the Interface object 225 for the particular database 145. The ClassFactory object 215 of the Automation Server 100 then creates the Interface object 225 for the particular database 145.

At step 670, the ClassFactory object 215 determines whether the Interface object 225 has been created. If the ClassFactory object 215 is unable to create the Interface object 225, then the ClassFactory object 215 proceeds to step 671. At step 671, the ClassFactory object 215 of the Automation Server 100 returns a "failed" signal to the OLE interface 110, which forwards the signal to the application program 130. At step 699, the application program 130 then notifies the user of the failure. However, if the ClassFactory successfully creates the Interface object 225, then the Automation Server 100 returns control to the OLE interface 110 at step 675.

At step 675, the OLE interface 110 obtains pointers to the methods and properties of the Interface object 225, and sends virtual table (VTABLE) numbers corresponding to the pointers to the application program 130. At step 699, the application program 130 then returns control to the user and uses the VTABLE numbers for the Interface object 225 to allow the user to call methods and properties relating to the database 145 associated with the Interface object 225.

Figure 7:
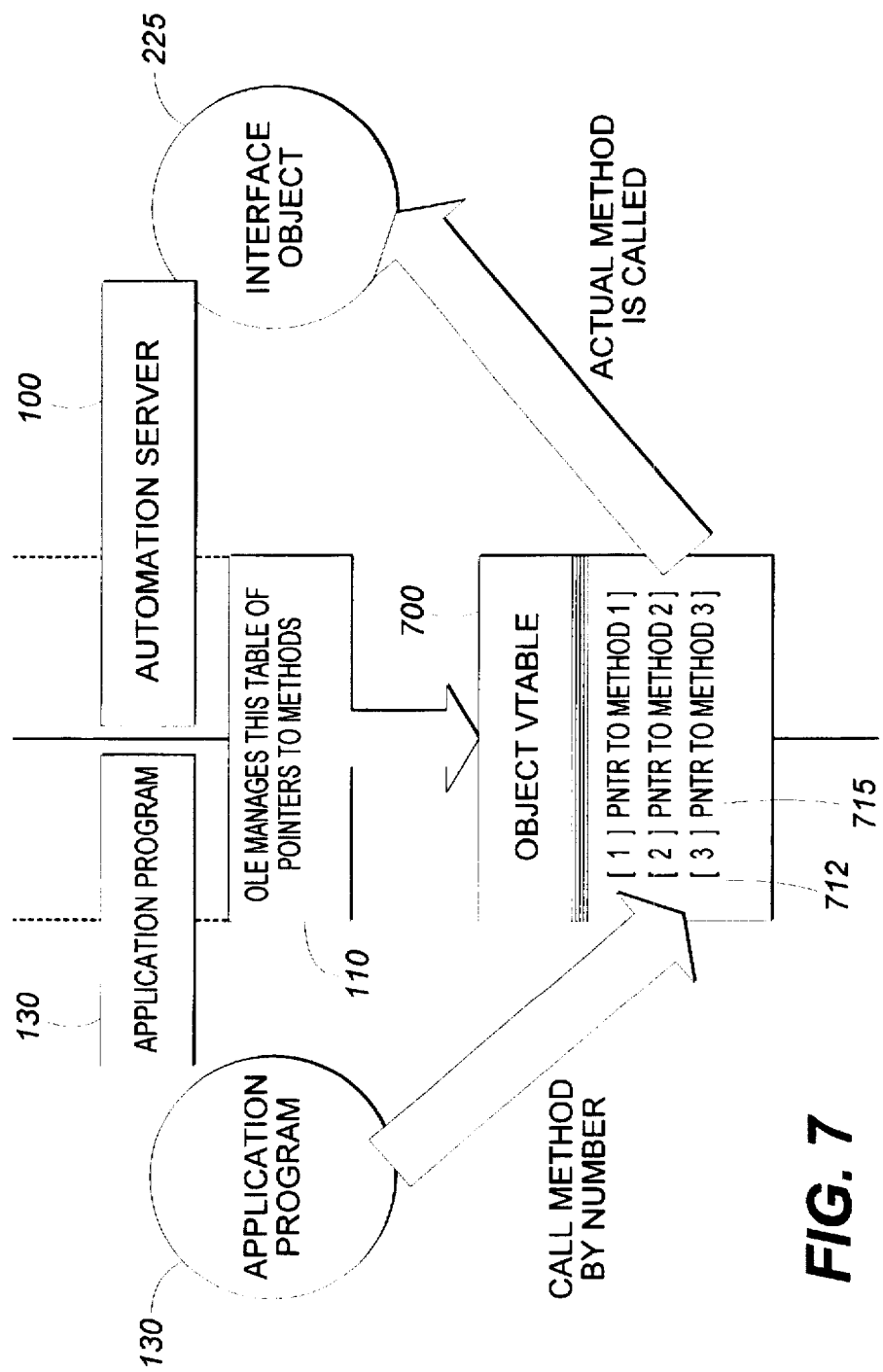
FIG. 7 depicts a flow diagram of an application program calling a method of a database centric using a virtual table of pointers to methods of the object.

FIG. 7 illustrates a virtual table (VTABLE) 700 which, in a preferred embodiment, is a component of the OLE interface 110. The VTABLE 700 is used for storing pointers 715 to methods and properties of a database centric object and VTABLE numbers 712 corresponding to each pointer 715. As described above, the application program 130 uses the VTABLE number 712 at a later time to request the OLE interface 110 to call a method or property. The OLE interface 110 then uses the VTABLE number 712 to request the Interface object 225 of the Automation Server 100 to call the particular method or property. The OLE interface 110 manages the VTABLE 700 of pointers 715 to methods and properties through a process called Lightweight Remote Procedure Call (LRPC), which is a shared memory technique (indicated by the dotted line) that allows the OLE interface 110 to share memory with both the application program 130 and the Automation Server 100.

Figure 8:
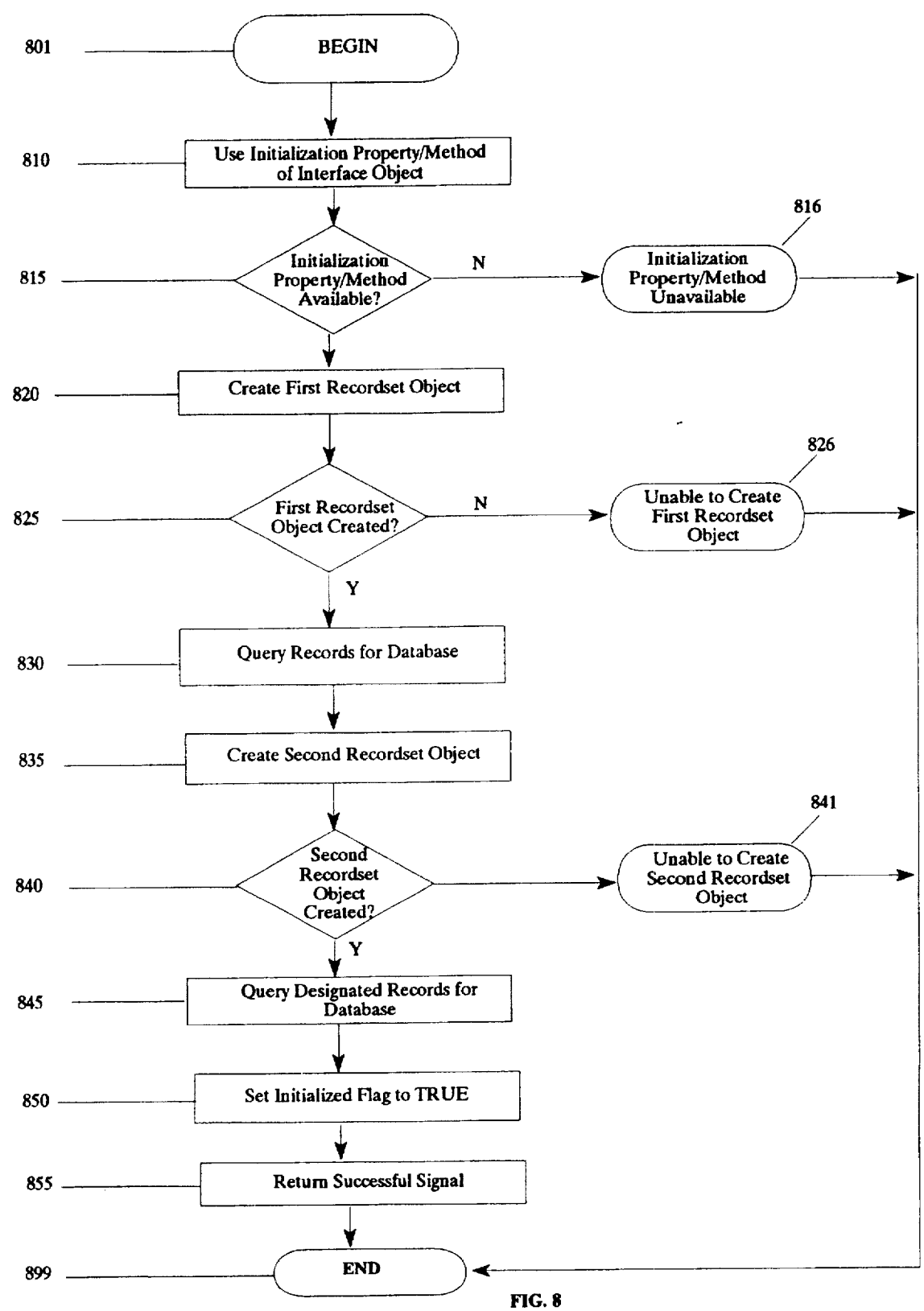
FIG. 8 depicts a flow diagram for initializing an object representative of a database in a preferred embodiment of the present invention.

FIG. 8 illustrates how the Initialization Property/Method 310 of an Interface object 225 is used to perform an initial query, which enumerates an answer set from the database 145. The process begins at step 801, where the application program 130 receives an "Initialization Method" command from a user via an enduser workstation 135. At step 810, the application program 130 then requests the OLE interface 110 to use the Initialization Property/Method 310 of a particular Interface object 225 to perform the initial query.

At step 815, the OLE interface 110 verifies that the Initialization Property/Method 310 for the Interface object 225 is available. If the Initialization Property/Method 310 is not available, then the OLE interface 110 proceeds to step 816 where it returns a "failed" signal to the application program 130. At step 899, the application program 130 then notifies the user of the failure. However, if the Interface object 225 has an available Initialization Property/Method 310, then the OLE interface 110 requests the Interface object 225 of the Automation Server 100 to create one or more Recordset objects 235 with the Initialization Property/ Method 310.

At step 820, the Interface object 225 uses its Initialization Property/Method 310 to create a first (master) Recordset object 235 to get access to one or more fields in the database 145. At step 825, the Interface object 225 then determines whether the first Recordset object 235 was created. If the Interface object 225 was unable to create the first Recordset object 235, then the Interface object 225 proceeds to step 826 where it returns a "failed" signal to the OLE interface 110, which forwards the signal to the application program 130. At step 899, the application program 130 then notifies the user of the failure. However, if the Interface object 225 successfully creates the first Recordset object 235, then the Interface object 225 proceeds to step 830.

At step 830, the Interface object 225 checks to determine whether the query has any Initialization Properties 310 associated with it. If not, the Interface object 225 calls on the first Recordset object 235 to perform a query on all the records for the particular fields in the database 145. However, if Initialization Properties 310 are required for the query, then the property characteristics are passed to the first Recordset object 235 and the Interface object then uses the property characteristics to perform the parameterized query in order to return a subset of the database 145.

At step 835, the Interface object 225 then uses its Initialization Property/Method 310 to create a second (slave) Recordset object 235 to access one or more records corresponding to values in the field(s) accessed by the first (master) Recordset object 235. At step 840, the Interface object 225 then determines whether the second Recordset object 235 was created.

If the Interface object 225 was unable to create the second Recordset object 235, then the Interface object 225 proceeds to step 841 where it returns a "failed" signal to the OLE interface, which forwards the signal to the application program 130. At step 899, the application program 130 then notifies the user of the failure. However, if the Interface object 225 successfully creates the second Recordset object 235, the Interface object 225 proceeds to step 845. At step 845, the Interface object 225 calls on the second Recordset object 235 to perform a query on the designated records for these fields in the database 145.

At step 850, the Interface object 225 sets an Initialized flag to "true" to make all other methods available to the user.

At step 855, the Interface object 225 returns a "successful" signal to the OLE interface 110, which forwards it to the application program 130. At step 899, the application program 130 returns control to the user and allows the user to access the other methods of the Automation Server 100.

Figure 9:
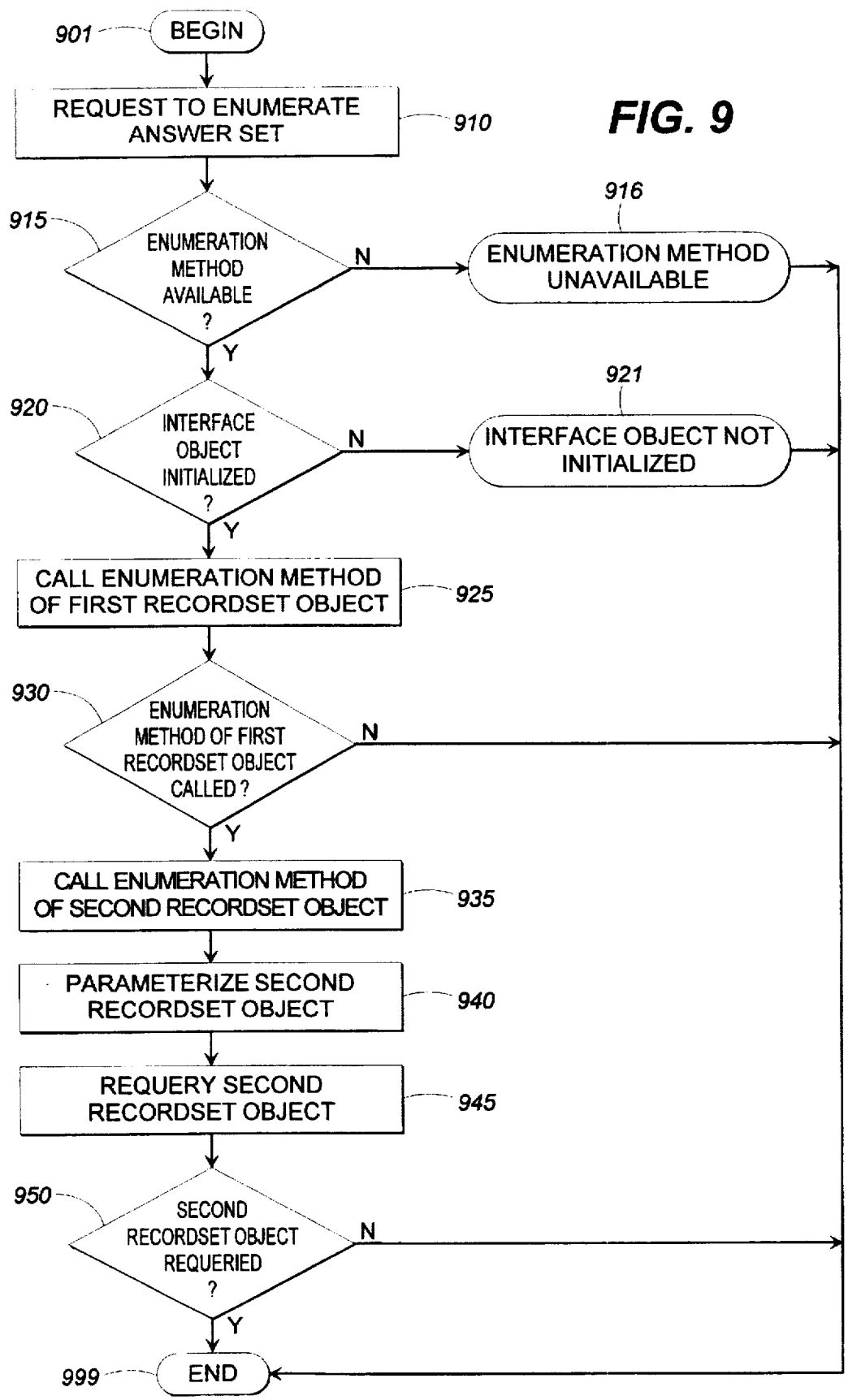
FIG. 9 depicts a flow diagram for traversing the records of a database with methods of an object in a preferred embodiment of the present invention.

FIG. 9 illustrates how the Enumeration Method 320 of the Interface object 225 is used to traverse the records of the answer set initially queried by the Initialization Property/Method 310. The process begins at step 901, where the application program 130 receives an "Enumeration Method" command (e.g., move to the next record) from a user via an enduser workstation 135. At step 910, the application program 130 then requests the OLE interface 110 to use the particular Enumeration Method 320 (e.g., MoveNext( ) for move to the next record) of a particular Interface object 225 to enumerate the answer set as requested by the user.

At step 915, the OLE interface 110 verifies that the Enumeration Method 320 in connection with enumerating the answer set is available for the Interface object 225. If the Enumeration Method 320 is not available, then the OLE interface 110 proceeds to step 916 where it returns a "failed" signal to the application program 130. At step 999, the application program 130 then notifies the user of the failure. However, if the Enumeration Method 320 requested is available for the Interface object 225, then the OLE interface 110 requests the Interface object 225 of the Automation Server 100 to determine whether it is already initialized as described in FIG. 6.

At step 920, the Interface object 225 determines whether it is initialized by checking the Initialized flag. If the Initialized flag is set to "false," then the Interface object 225 determines that it has not been initialized and proceeds to step 921. At step 921, the Interface object 225 returns a "failed" signal to the OLE interface 110, which forwards it to the application program 130. At step 999, the application program 130 then notifies the user of the failure. However, if the Initialized flag is set to "true," then the Interface object 225 determines that it has been initialized and proceeds to enumerate the answer set.

The Interface object 225 uses the Enumeration Method 320 to enumerate the answer set. At step 925, the Interface object 225 achieves this result by calling the Enumeration Method 320 of the first (master) Recordset object 235 associated with the Interface object 225. At step 930, the Interface object 225 determines whether the Enumeration Method 320 of the first Recordset object 235 was called.

If the Enumeration Method 320 was unable to be called, then the Interface object 225 sends a "failed" signal to the OLE interface 110, which forwards it to the application program 130. At step 999, the application program 130 then notifies the user of the failure. However, if the Enumeration Method 320 of the first (master) Recordset 235 object is successfully called and the Enumeration Method 320 (e.g., move to the next record) is successfully completed, then the Interface object 225 proceeds to step 935.

At step 935, the Interface object 225 calls the Enumeration Method 320 of the second (slave) Recordset object 235 associated with the Interface object 225. At step 940, the second Recordset object 235 is then parameterized with a field from the first (master) Recordset object 235. The Interface object 225 then proceeds to step 945, where it requeries the second (slave) Recordset object 235. At step 950, the Interface object 225 determines whether the second Recordset object 235 was requeried.

If the requery fails, then the Interface object 225 sends a "failed" signal to the OLE interface 110, which forwards it to the application program 130. At step 999, the application program 130, then notifies the user of the failure.

However, if the requery is successful and the Enumeration Method 320 (e.g., move to the next record) is successfully completed, then the Interface object sends a "successful" signal to the OLE interface 110. The OLE interface 110 then forwards the "successful" signal to the application program 130. Finally, at step 999, the application program 130 uses the Access Properties/Methods 350 to obtain the data corresponding to the records of the database 145 as requested by the user.

Figure 10:
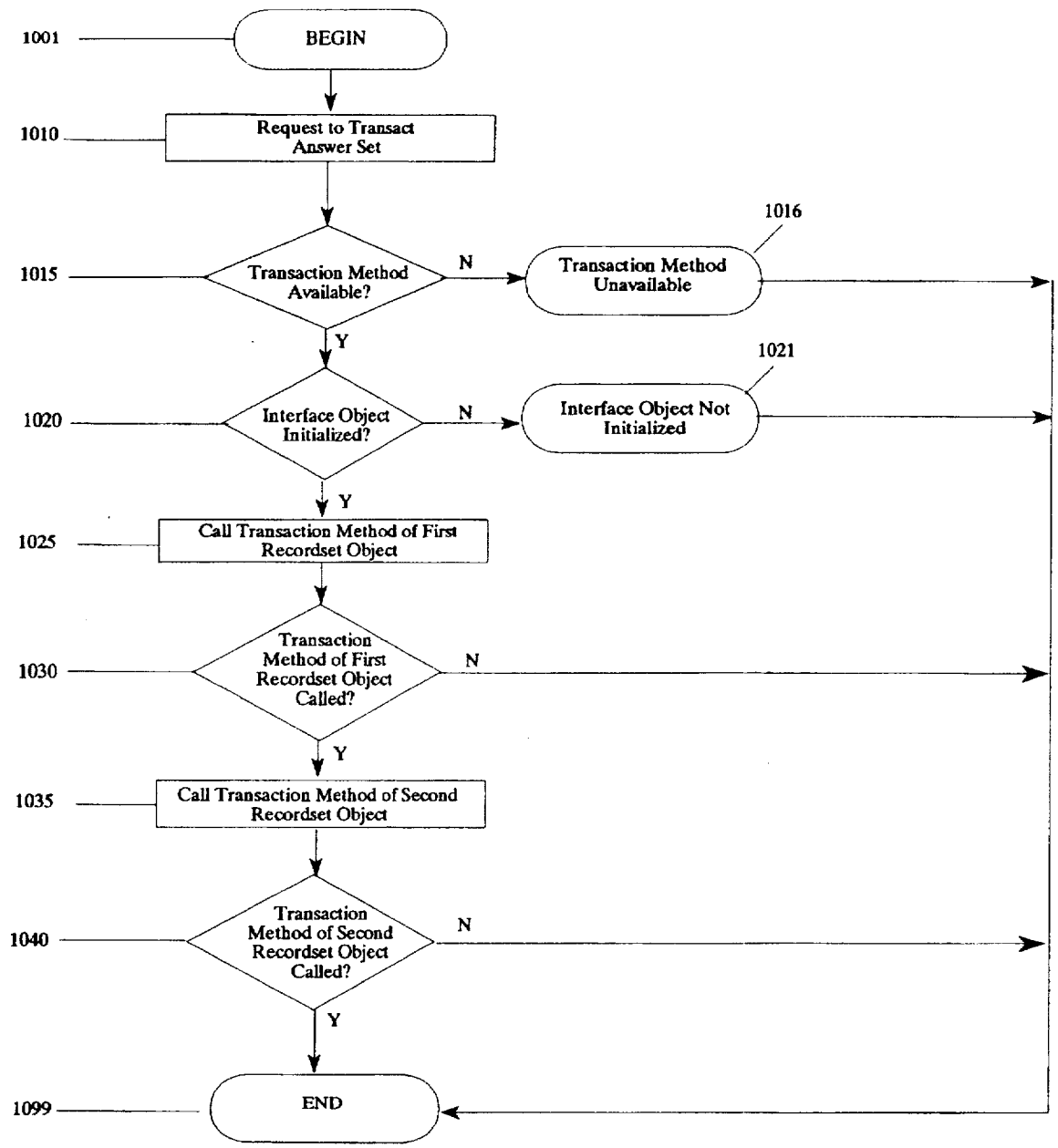
FIG. 10 depicts a flow diagram for transacting the records of a database with methods of an object in a preferred embodiment of the present invention.

FIG. 10 illustrates how the Transaction Method 330 of the Interface object 225 is used to add a new record to the answer set initially enumerated by the Initialization Property/Method 310. The process begins at step 1001, where the application program 130 receives a "Transaction Method" command from a user via an enduser workstation 135. At step 1010, the application program 130 then requests the OLE interface 110 to use the particular Transaction Method 320 (e.g., Void New( ) for add a new record to the database) of a particular Interface object 225 to transact the answer set as requested by the user.

At step 1015, the OLE interface 110 verifies that the Transaction Method 330 in connection with adding the new record to the database is available for the Interface object 225. If the Transaction Method 330 is not available, then the OLE interface 110 proceeds to step 1016 where it returns a "failed" signal to the application program 130. At step 1099, the application program 130 then notifies the user of the failure. However, if the Transaction Method 330 requested is available for the Interface object 225, then the OLE interface 110 requests the Interface object 225 of the Automation Server 100 to determine whether it is already initialized.

At step 1020, the Interface object 225 determines whether it is initialized by checking the Initialized flag. If the Initialized flag is set to "false," then the Interface object 225 determines that it has not been initialized and proceeds to step 1021. At step 1021, the Interface object 225 returns a "failed" signal to the OLE interface 110, which forwards it to the application program 130. At step 1099, the application program 130 then notifies the user of the failure. However, if the Initialized flag is set to "true," then the Interface object 225 determines that it has been initialized and proceeds to enumerate the answer set.

The Interface object 225 then uses the Transaction Method 330 to transact the answer set. At step 1025, the Interface object 225 achieves this result by calling the Transaction Method 330 of the first (master) Recordset object 235 associated with the Interface object 225. At step 1030, the Interface object 225 determines whether the Transaction Method 330 of the first Recordset object 235 was called.

If the Transaction Method 330 was unable to be called, then the Interface object 225 sends a "failed" signal to the OLE interface 110, which forwards it to the application program 130. At step 1099, the application program 130 then notifies the user of the failure. However, if the Transaction Method 330 of the first (master) Recordset 235 object is successfully called and the Transaction Method 330 (e.g., add a new record) is successfully completed, then the Interface object 225 proceeds to step 1035.

At step 1035, the Interface object 225 calls the Transaction Method 330 of the second (slave) Recordset object 235 associated with the Interface object 225. At step 1040, the Interface object 225 determines whether the Transaction Method 330 of the second Recordset object 235 was called. If the Transaction Method 330 was unable to be called, then the Interface object 225 sends a "failed" signal to the OLE interface 110, which forwards it to the application program 130. At step 1099, the application program 130, then notifies the user of the failure.

However, if the Transaction Method 330 of the second (slave) Recordset 235 is successfully called and the Transaction Method (e.g., add a new record) is successfully completed, then the Interface object 225 sends a "successful" signal to the OLE interface 110, and the OLE interface 110 then forwards the "successful" signal to the application program 130. Finally, at step 1099, the application program 130 uses the Access Properties/Methods 350 to obtain the transacted record as requested by the user.

Figure 11:
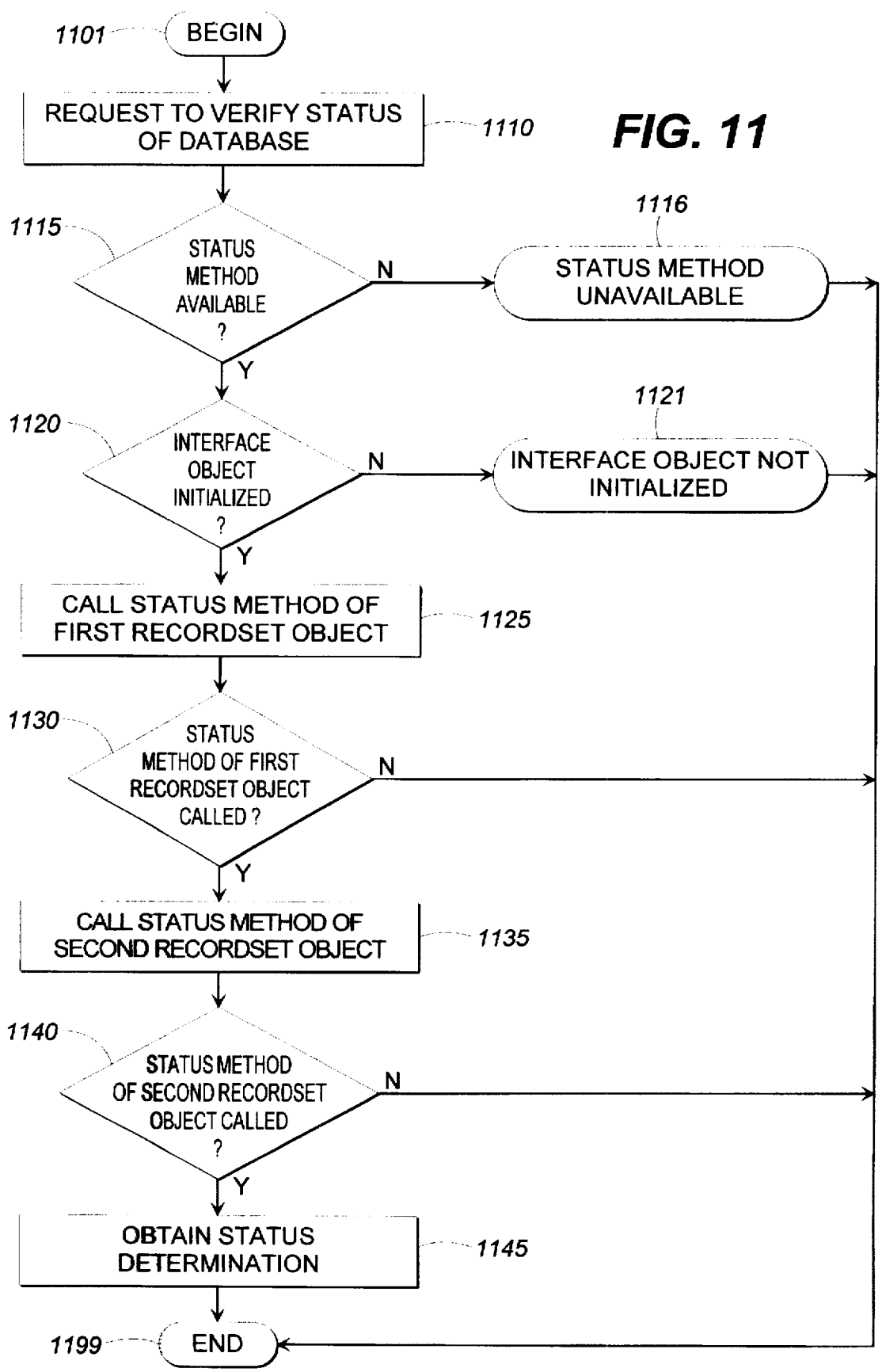
FIG. 11 depicts a flow diagram for verifying the status of the records of a database with methods of an object in a preferred embodiment of the present invention.

FIG. 11 illustrates how the Status Method 340 of the Interface object 225 is used to determine the capabilities of the underlying database 145 in which the answer set has been queried. The process begins at step 1101, where the application program 130 receives a "Status Method" command from a user via an enduser workstation 135. At step 1110, the application program 130 then requests the OLE interface 110 to use the particular Status Method 340 (e.g., CanUpdate( ) for verifying that the database is Read/Write) of a particular Interface object 225 to determine the capabilities of the database as requested by the user.

At step 1115, the OLE interface 110 verifies that the Status Method 340 in connection with enumerating the database is available for the Interface object 225. If the Status Method 340 is not available, then the OLE interface 110 proceeds to step 1116 where it returns a "failed" signal to the application program 130. At step 1199, the application program 130 then notifies the user of the failure. However, if the Status Method 340 requested is available for the Interface object 225, then the OLE interface 110 requests the Interface object 225 of the Automation Server 100 to determine whether it is already initialized.

At step 1120, the Interface object 225 of the Automation Server 100 determines whether it is initialized by checking the Initialized flag. If the Initialized flag is set to "false," then the Interface object 225 determines that it has not been initialized and proceeds to step 1121. At step 1121, the Interface object 225 returns a "failed" signal to the OLE interface 110, which forwards it to the application program 130. At step 1199, the application program 130 then notifies the user of the failure. However, if the Initialized flag is set to "true," then the Interface object 225 determines that it has been initialized and proceeds to enumerate the answer set.

The Interface object then uses the Status Method 340 to verify the capabilities of the database 145. At step 1125, the Interface object 225 achieves this result by calling the Status Method 340 of the first (master) Recordset object 235 associated with the Interface object 225. At step 1130, the Interface object 225 determines whether the Status Method 340 of the first Recordset object 235 was called.

If the Status Method 340 was unable to be called, then the Interface object 225 sends a "failed" signal to the OLE interface 110, which forwards it to the application program 130. At step 1199, the application program 130 then notifies the user of the failure. However, if the Status Method 340 of the first (master) Recordset object 235 is successfully called and the Status Method 340 (e.g., verify read/write status) is successfully completed, then the Interface object 225 proceeds to step 1135.

At step 1135, the Interface object 225 calls the Status Method 340 of the second (slave) Recordset object 235 associated with the Interface object 225. At step 1140, the Interface object 225 determines whether the Status Method 340 of the second Recordset object 235 was called. If the Status Method 340 was unable to be called, then the Interface object 225 sends a "failed" signal to the OLE interface 110, which forwards it to the application program 130. At step 1199, the application program 130, then notifies the user of the failure. However, if the Status Method 340 of the second (slave) Recordset object 235 is successfully called and the Status Method 340 (e.g., verify read/write status) is successfully completed, then the Interface object 225 makes a determination of the status.

A status determination may be obtained by checking a Boolean value resulting from ANDing status values from both Recordset objects 235. At step 1145, the Interface object 225 obtains the determination of the status and forwards the status determination to the OLE interface 110. The OLE interface 110 then forwards the status determination to the application program 130. Finally, at step 1199, the application program 130 returns control to the user and notifies the user of the status of the records of the database 145, as requested by the user.

Figure 12:
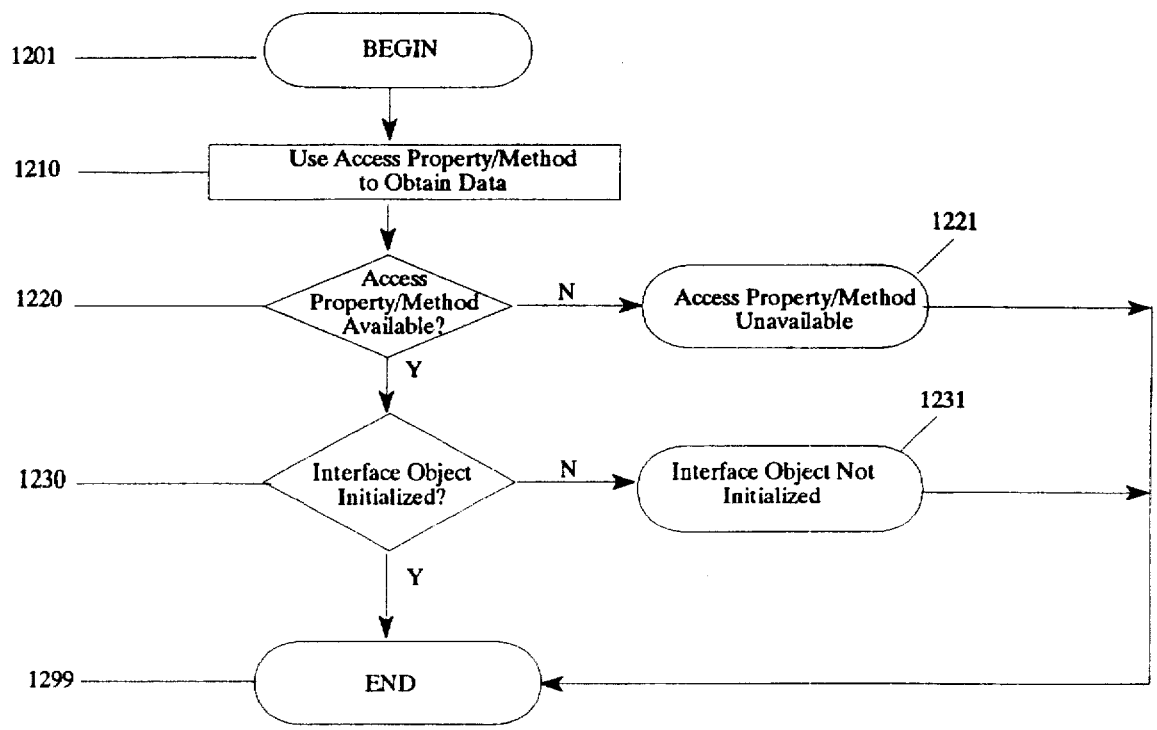
FIG. 12 depicts a flow diagram for obtaining data from the records of a database with methods and properties of an object in a preferred embodiment of the present invention.

FIG. 12 illustrates how the Access/Property 350 of the Interface object 225 is used to obtain data in connection with one or more particular fields of a record in the answer set of the database 145 enumerated by the Initialization Method 310. The process begins at step 1201, where the application program 130 receives an "Obtain" command from a user via an enduser workstation 135. At step 1210, the application program 130 then requests the OLE interface 110 to use a particular Access Property/Method 350 of a particular Interface object 225 to obtain data for a particular field in the database 145.

At step 1220, the OLE interface 110 verifies that the Access Property/Method 350 in connection with obtaining data from the particular field is available for the Interface object 225. If the Access Property/Method 350 is not available, then the OLE interface 110 proceeds to step 1221 where it returns a "failed" signal to the application program 130. At step 1299, the application program 130 then notifies the user of the failure. However, if the Interface object 225 has an available Access Property/Method 350 for obtaining data in the particular field, then the OLE interface 110 requests the Interface object 225 of the Automation Server 100 to determine whether it is already initialized.

At step 1230, the Interface object 225 determines whether it has been initialized by checking the Initialized flag. If the Initialized flag is set to "false," then the Interface object 225 determines that it has not been initialized and proceeds to step 1231. At step 1231, the Interface object 225 returns a "failed" signal to the OLE interface 110, which forwards it to the application program 130. At step 1299, the application program 130 then notifies the user of the failure. However, if the Initialized flag is set to "true", then the Interface object 225 determines that it has been initialized.

The Interface object 225 then obtains and returns a copy of the data to the OLE interface. In doing so, the Access Property 350 of the Interface object 225 acts as the criteria for obtaining the data, and the Access Method 350 of the Interface object 225 actually obtains the data.

The OLE interface 110 then forwards the data to the application program 130. Finally, at step 1299, the application program 130 returns control to the user and displays the data to the user on the enduser workstation 135.

Figure 13:
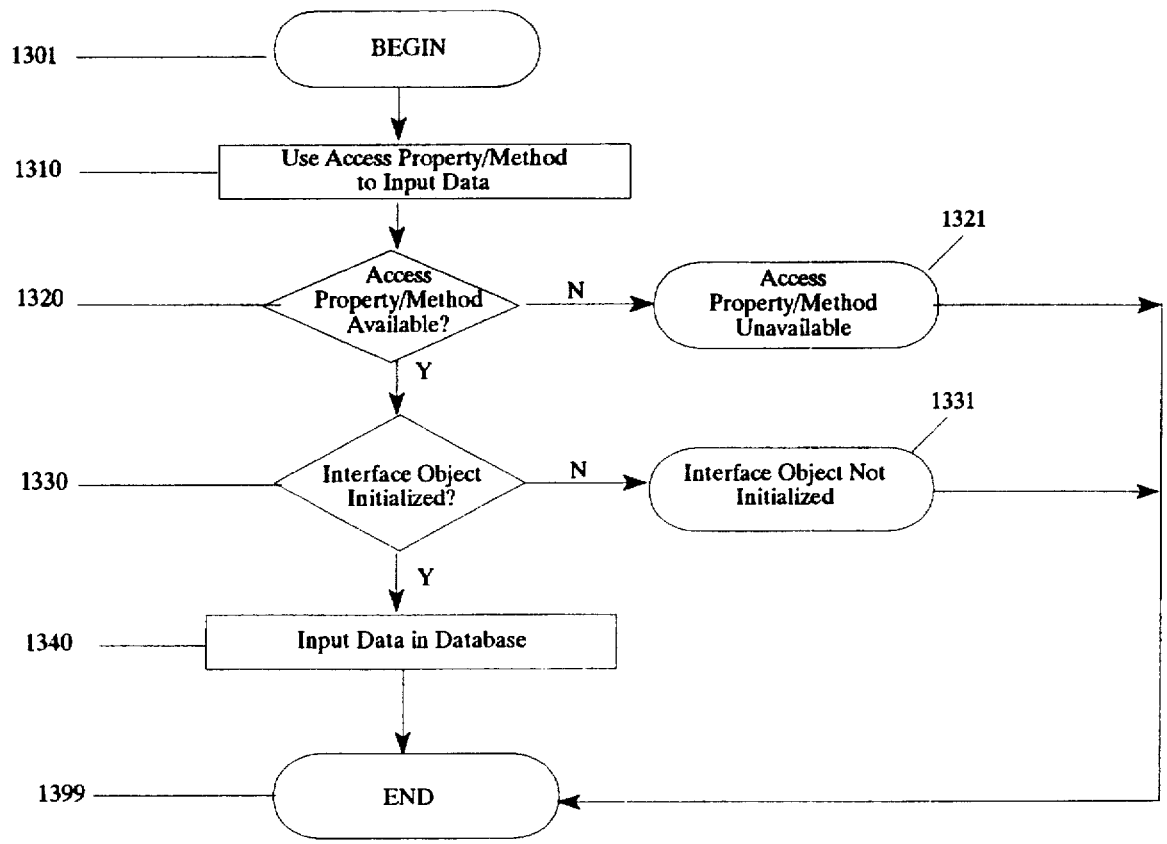
FIG. 13 depicts a flow diagram for inputting data into a record of a database with methods and properties of an object in a preferred embodiment of the present invention.

FIG. 13 illustrates how the Access Property/Method 350 of the Interface object 225 is used to input data in connection with one or more particular fields of a record in the answer set of the database 145 enumerated by the Initialization Method 310. The process begins at step 1301, where the application program 130 receives an "Input" command from a user via an enduser workstation 135. At step 1310, the application program 130 then requests the OLE interface to use a particular Access Property/Method 350 of a particular Interface object 225 to input data for a particular field in the database 145.

At step 1320, the OLE interface 110 verifies that the Access Property/Method 350 in connection with inputting the data into the particular field is available for the Interface object 225. If the Access Property/Method 350 is not available, then the OLE interface 110 proceeds to step 1321 where it returns a "failed" signal to the application program 130. At step 1399, the application program 130 then notifies the user of the failure. However, if the Interface object 225 has an available Access Property/Method 350 for inputting data into the particular field, then the OLE interface 110 requests the Interface object 225 of the Automation Server 100 to determine whether it 215 is already initialized.

At step 1330, the Interface object 225 determines whether it has been initialized by checking the Initialized Flag. If the Initialized flag is set to "false," then the Interface object 225 determines that the Interface object 225 has not been initialized and proceeds to step 1331. At step 1331, the Interface object 225 returns a "failed" signal to the OLE interface 110, which forwards it to the application program 130. At step 1399, the application program 130 then notifies the user of the failure. However, if the Initialized flag is set to "true," then the Interface object 225 determines that it has been initialized, and the Interface object 225 proceeds to step 1340.

At step 1340, the Interface object 225 uses the Access Property/Method 350 for the particular field to input the requested data in the field. Here, the Access Property 350 acts as the criteria for inputting the data, and the Access Method 350 actually inputs the data. The Interface object 225 then returns control to the OLE interface 110.

The OLE interface 110 then returns control to the application program 130. Finally, at step 1399, the application program 130 returns control to the user and indicates to the user that the data has been accepted via the enduser workstation 135.

Figure 14:
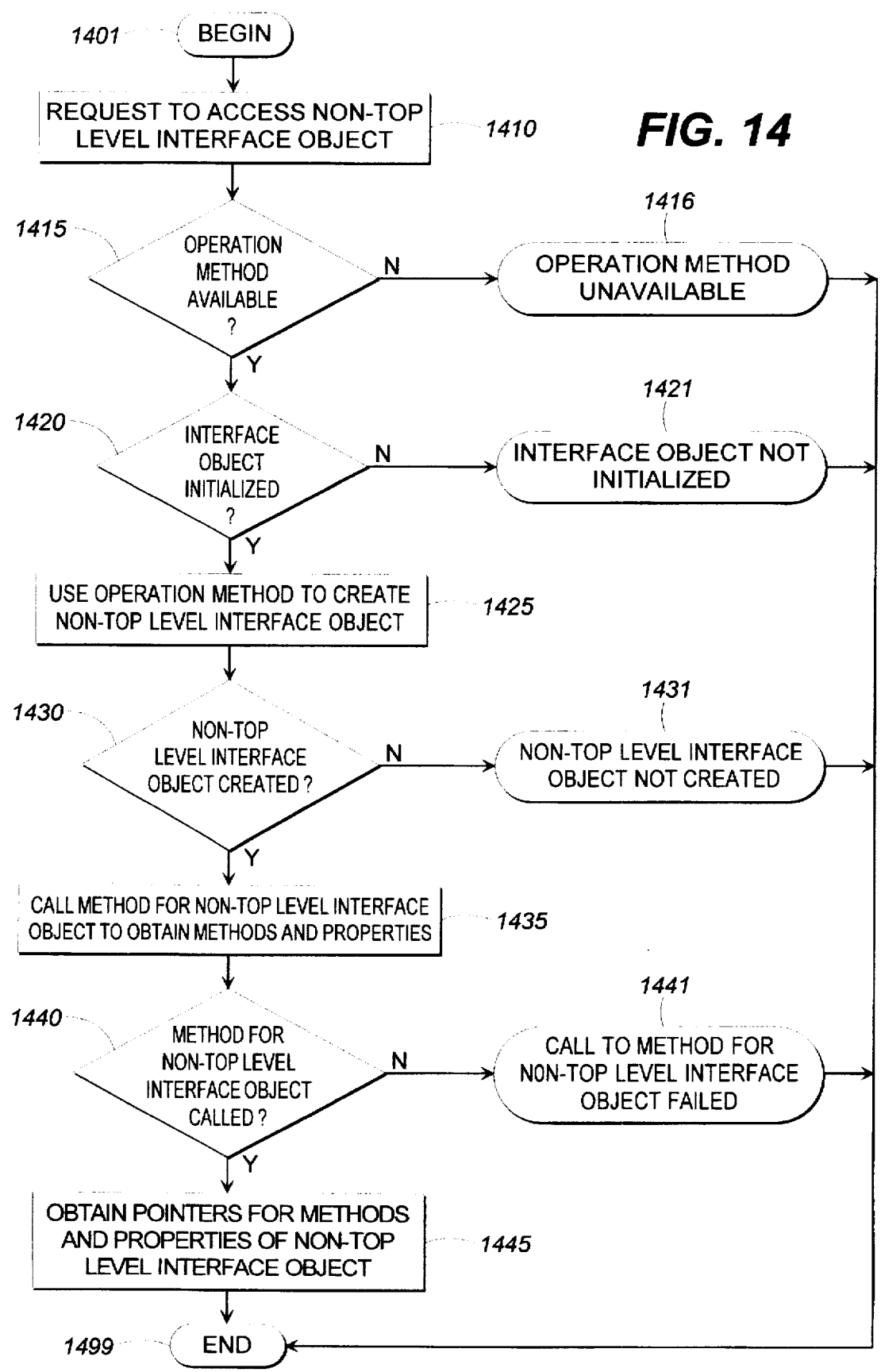
FIG. 14 depicts a flow diagram for accessing a non-top level object representative of a database through a top level object representative of another database in a preferred embodiment of the present invention.
Figure 18:
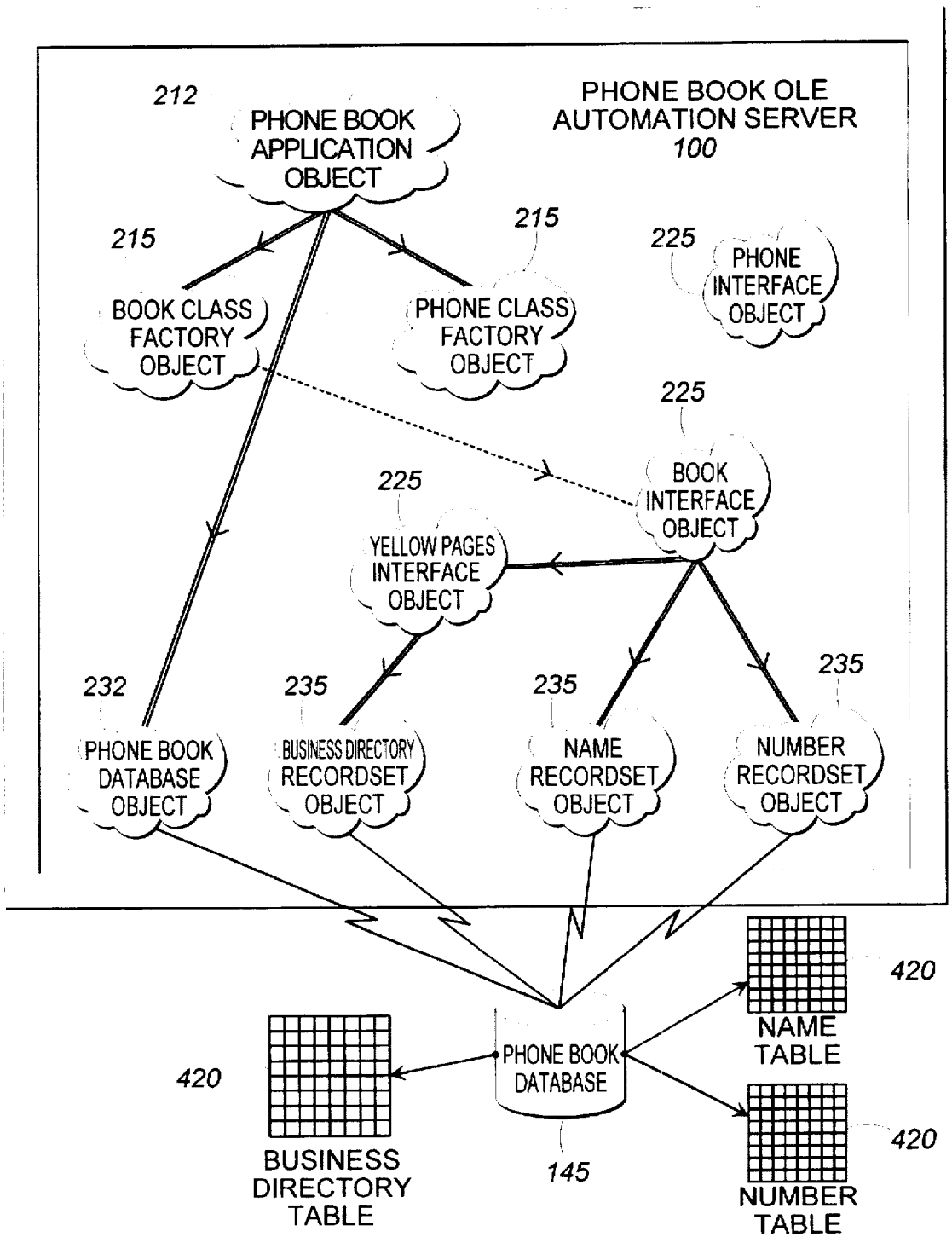
FIG. 18 depicts the relationship between several objects and the different components of these objects, as well as their relationship with a Phone Book database, in an illustrative example of an object representation of the Phone Book database in a preferred embodiment of the present invention.

FIG. 14 illustrates how an Operation Method 360 of a top level Interface object 225 is used to access a non-top level Interface object 225. The process begins at step 1401, where the application program 130 receives an "Operation Method" command (e.g., access a non-top level database centric object) from a user via an enduser workstation 135. At step 1410, the application program 130 then requests the OLE interface 110 to use the particular Operation Method 360 of a particular Interface object 225 to access the non-top level Interface object 225 as requested by the user.

At step 1415, the OLE interface 110 verifies that the Operation Method 360 in connection with accessing the non-top level Interface object 225 is available for the top level Interface object 225. If the Operation Method 360 is not available, then the OLE interface 110 proceeds to step 1416 where it returns a "failed" signal to the application program 130. At step 1499, the application program 130 then notifies the user of the failure. However, if the Operation Method 360 requested is available for the top level Interface object 225, then the OLE interface 110 requests the top level Interface object 225 of the Automation Server 100 to determine whether it is already initialized.

At step 1420, the top level Interface object 225 determines whether it is initialized by checking the Initialized flag. If the Initialized flag is set to "false," then the top level Interface object 225 determines that it has not been initialized and proceeds to step 1421. At step 1421, the top level Interface object 225 returns a "failed" signal to the OLE interface 110, which forwards it to the application program 130. At step 1499, the application program 130 then notifies the user of the failure. However, if the Initialized flag is set to "true," then the top level Interface object determines that it has been initialized and proceeds to access the non-top level Interface object 225.

The top level Interface object then uses the Operation Method 360 to access the top level Interface object 225. At step 1425, the top level Interface object 225 achieves this result by using the Operation Method 360 to create the non-top level Interface object 225. At step 1430, the Interface object 225 determines whether the Operation Method 360 created the non-top level Interface object 225.

If the Operation Method 360 was unable to create the non-top level Interface object 225, then the top level Interface object 225 proceeds to step 1431. At step 1431, the top level Interface object 225 sends a "failed" signal to the OLE interface 110, which forwards it to the application program 130. At step 1499, the application program 130 then notifies the user of the failure. However, if the Operation Method 330 object successfully creates the non-top level Interface object 225, then the top level Interface object 225 proceeds to step 1435.

At step 1435, the top level Interface object 225 calls a method, referred to as the GetIDispatch method, of the non-top level Interface object 225 to obtain the methods and properties for the non-top level Interface object 225. At step 1440, the top level Interface object 225 determines whether the call to the GetIDispatch method of the non-top level Interface object 225 was successful. If the call fails, then the Interface object 225 proceeds to step 1441. At step 1441, the Interface object 225 sends a "failed" signal to the OLE interface 110, which forwards it to the application program 130. At step 550, the application program 130, then notifies the user of the failure. However, if the call is successful, then the top level Interface object 225 proceeds to step 1445.

At step 1445, the non-top level Interface object 225 obtains pointers to the methods and properties of the non-top level Interface object 225 and forwards it to the OLE interface 110. The OLE interface 110 then forwards the method and property values corresponding to the pointers stored in the VTABLE to the application program 130. Finally, at step 1499, the application program 130 returns control to the user and uses the method and property values to further access the non-top level Interface object 225 based on further instructions by the user.

The following is an illustrative example of how a user creates and accesses a database centric object. In this example, a PhoneBook Automation Server 100, which contains several objects is described. Specifically, the PhoneBook Automation Server 100 is used to allow a user to select a phone number from a database 145 represented by objects and automatically dial the phone number with a modem activated by a set of command interfaces represented by a third object.

The first object, referred to as the Book object, is a database centric object representative of a set of relational database tables 420. These database tables 420 includes fields used to store a first name, a last name and a phone number. The second object, referred to as the YellowPages object, is a database centric object representative of one relational database table 420. This relational database table 420 includes fields used to store a business type and the name, address and phone number or information of a business. The relational database tables 420 represented by the Book and YellowPages objects compose, what is referred to as, the PhoneBook database 145.

The third object, referred to as the Phone object, is a document centric object. The Phone object represents a method for automatically dialing a phone number selected by a user via the Book or the YellowPages objects.

Referring to FIG. 5, a user must first implement the PhoneBook Automation Server 100. As discussed above, the PhoneBook Automation Server 100 is preferably implemented with Visual C++.

At step 510, the user must define the database 145. As described above, the database type is preferably one accessible by the ODBC Interface 120, such as Sybase, Oracle, and Access.

For this example, the portion of the PhoneBook database 145 represented by the Book object is defined to include a Name relational database table 420 and a Number relational database table 420. The Name database table 420 is used to store names and a unique identifier for each name, so that entries with the same name but different phone numbers may be stored.

Referring to FIG. 15, the Name database table 420 is defined to contain three fields. The first field, referred to as the "first" field, represents a "first name" and is defined as a string data type of up to twenty characters. The second field, referred to as the "last" field represents a "last name" and is defined as a string data type of up to thirty characters. The third field, referred to as the "id" field, represents a unique identifier for a particular first and last name combination and is defined as an integer data type.

The Number database table 420 is used to store phone numbers and a unique identifier corresponding to the "id" field in the Name database table 420. Referring to FIG. 16, each record in the Number database table 420 contains two fields. The first field, referred to as the "number" field, represents a "phone number" and is defined as a character data type of up to 20 characters. The second field, referred to as the "name$_{13}$id" field, corresponds to the "id" field in the Name database table 420.

The portion of the PhoneBook database 145 represented by the YellowPages object is defined to include one relational database table 420 called the Business Directory relational database table 420. The Business Directory database table 420 is used to store names, addresses, phone numbers and other information in connection with different businesses (companies).

Referring to FIG. 17, the Business Directory database table 420 is defined to contain eight fields. The first field, referred to as the "business" field, represents a category of business and is defined as a character data type of up to thirty characters. The second field, referred to as the "name" field, represents a company name and is defined as a character data type of up to twenty characters. The third field, referred to as the "address" field, represents a company's street address and is defined as a character data type of up to 255 characters. The fourth field, referred to as the "city" field, represents a company's city and is defined as a character data type of up to twenty characters. The fifth field, referred to as the "state" field, represents a company's state and is defined as a character data type of up to two characters. The sixth field, referred to as the "zip" field, represents a company's zip code and is defined as a character data type of up to ten characters. The seventh field, referred to as the "voice" field, represents a company's voice phone number and is defined as a character data type of up to fifteen characters. Finally, the eighth field, referred to as the "fax" field, represents a company's facsimile phone number and is defined as a character data type of up to fifteen characters.

At step 520, the user then generates the template for the PhoneBook Automation Server 100 with the AppWizard feature of Visual C++ and modifies the template for database centric use. In doing so, the Application class for the PhoneBook Application object 212 is generated, and a predefined Database class for the PhoneBook Database object 232 is pulled in from the Visual C++ library of classes.

At step 530, the user then defines the ClassFactory objects 215 of the PhoneBook Automation Server 100 with ClassFactory classes. Here, for the document centric objects, the user defines a ClassFactory object 215 for each top level Interface object 225 of the Automation Server 100. For this example, the user defines the Book object as a top level object and the Yellow Pages object as a non-top level object. Therefore, only a ClassFactory class for the Book ClassFactory object is defined for the database centric objects. Also, a Phone ClassFactory object for the Phone document centric object is defined at this time.

An example of a Visual C++ command for defining the Book ClassFactory object 215 is "Class CBookCF: public C01eObjectFactory." Further, in defining the Book ClassFactory object 215, a Class ID (GUID) is assigned to the Book ClassFactory object 215.

At step 540, the user then defines the PhoneBook Application object 212 for the Automation Server 100 with the Application class that was generated with the Automation Server 100 template. An example of a Visual C++ command for generating the PhoneBook Application object 212 is "Class CPhoneBookApp: public CWinApp". The Application class is further modified to define the objects associated with the PhoneBook Application object 212. Specifically, the PhoneBook Database object 232, Book ClassFactory object 215 and Phone ClassFactory object 215 are defined as the objects associated with the PhoneBook Application object 212.

The Application class for the PhoneBook Application object 212 is also modified to initialize and exit the PhoneBook Automation Server 100. For example, initializing commands to get the OLE may request the PhoneBook Database object 232 to open a connection with the PhoneBook database 145 and may request the Book ClassFactory object 215 to register itself with the OLE interface 110. Further, exit commands may include requesting the PhoneBook Database object 232 to close the connection with the PhoneBook database 145.

At step 550, the user partially defines the Book Interface object 225 and the Yellow Pages Interface object 225 of the PhoneBook Interface classes. Each Interface class may be easily generated with the Class Wizard feature of Visual C++. Further, an example of the primary command for the Interface class of the Book Interface object is "Class CBook: public ccmdTarget."

By using Class Wizard as described above, the user then defines the Initialization Properties/Methods 310, Enumeration Methods 320, Transaction Methods 330 and Status Methods 340 of the Book and Yellow Pages Interface objects 225. The Enumeration Methods 320, Transaction Methods 330, and Status Methods 340 include all the Visual C++ commands for implementing these methods as detailed above for the description of FIG. 5. The following are examples of Visual C++ commands for implementing the Initialization Properties/Methods 310 for the Book and Yellow Pages Interface objects 225.

The Book Interface object 225 includes Initialization Properties/Methods 310 for performing different initial queries on the Name and Number database tables 420 of the PhoneBook database 145. The method allows a user to access the names and phone numbers stored in the Name and Number database tables 420 of the PhoneBook database 145. This method is represented as "BOOL Query (short nQueryId)".

The Book Interface object 225 also includes two initial queries, which are defined in Visual Basic. The first query is defined as "Book.Query(1)" to represent all the entries in the Name and Number database tables 420. The second query is defined as "Book.Query(2)" to represent a specific name in the Name and Number database tables 420. To access a specific name and phone number, two Initialization Properties 310 would need to be set prior to calling "Book.Query (2)." Specifically, "Book.qFirstName" and "Book.qLastName" would need to be set prior to calling this second query.

The Yellow Pages Interface object 225 includes three Initialization Properties/Methods 310 for performing different initial queries on the Business Directory database table 420 of the PhoneBook database 145. The method allows a user to access the companies and associated information in the Business Directory table 420 of the PhoneBook database 145. This method, like the Initialization Method 310 of the Book Interface object 225, is also represented as "BOOL Query(short nQueryId)".

The Yellow Pages Interface object 225 also includes three intial queries. The first query is defined as "YellowPages.Query(1)" to represent all the entries in the Business directory table 420. The second query is defined as "YellowPages.Query(2)" to represent all entries in the Business Directory table 420 having a specific business category. To access a specific business category for the second query, a "YellowPages.qBusinessCategory" Initialiation Property 310 would need to be set prior to caling this query. The third query is defined as "YellowPages.Query(3)" to represent a specific company name in the Business Directory table 420. To access a specific company name for the third query, a "YellowPages.qCompanyName" Initialization Property 310 would need to be set prior to calling this query.

At step 560, the user defines the registration information of the PhoneBook Automation Server 100. Specifically, the user includes information associated with all objects found in the PhoneBook Automation Server 100. The user also assigns a Class ID for the Book ClassFactory object 215. The user assigns the Class ID for the Book object at this time because a class ID was only generated for the document centric object, the Phone object, at step 520.

At step 570, the user then defines the Recordset objects 235 for the Automation Server 100 with Recordset classes. The Class Wizard feature of Visual C++ is used to easily generate, define and map the Recordset classes. Specifically, a NameRecordset class associated with the Name database table 420 is defined for the NameRecordset object 235, a NumberRecordset class associated with the Number database table 420 is defined for the NumberRecordset object 235 and a Business Directory class associated with the Business Directory database table 420 is defined for the Business Directory Recordset object 235. The NameRecordset and NumberRecordset objects 235 are then mapped to the Book Interface object 225, and the Business Directory Recordset object 235 is then mapped to the Yellow Pages Interface object 225. An example of a Visual C++ command for implementing the NameRecordset object 235 is "Class CNameSet: public CRecordset".

At step 580, the user further defines the Book and Yellow Pages Interface objects 225. Particularly, the user defines the Access Properties/Methods 350 and the Operation Methods 360, if any, of these Interface objects 225. The following are examples of Visual C++ commands for implementing the Access Properties/Methods 350.

The Book Interface object 225 includes three Access Properties/Methods 350 to input and access data in the fields of the Name and Number database tables 420. These Access Properties 350 are "FirstName" for the "first" field which is associated with a first name in the Name database table 420; "LastName" for the "last" field which is associated with a last name in the Name database table 420; and "PhoneNumber" for the "number" field which is associated with a phone number in the Number database table 420. "GetFirstName( )" and "SetFirstName( )" are examples of Access Methods 350 for accessing and inputting data into the "first" field based on criteria corresponding to the "FirstName" property.

The Yellow Pages Interface object 225 includes eight Access Properties/Methods 350 to input and access data in the fields of the Business Directory database table 420. These Access Properties 350 are "Category" for the "business" field which is associated with a business category; "Name" for the "name" field which is associated with a company's name; "Address", "City", "State" and "Zip" for the fields of the same name which are associated with a company's complete address; and "Voice" and "Fax" for the fields of the same name which are associated with a company's voice and facsimile phone numbers. These properties will be used as criteria to determine what data is input or accessed by the corresponding methods.

The Book Interface object 225 also includes an Operation Method 360 for accessing the Yellow Pages Interface object 225. An example of a Visual C++ command for implementing an Operation Method 360 for accessing the Yellow Pages Interface object 225 is "LPDISPATCH YellowPages ( )."

Since the present invention is directed to the creation and usage of database centric objects, the illustrative example focuses only on this aspect of the PhoneBook Automation Server 100. However, for completeness purposes, the Phone document centric object is described to some extent. For example, the Phone object may be implemented with the following Visual C++ method: "BOOL Dial (LPCSTR strNumber)." This method will dial a phone number via the user's modem. The method will then return a "TRUE" signal if the number dialed was successfully called and a "FALSE" if the call was unsuccessful. Of course, the Phone object may be implemented before, during or after implementing the Book and YellowPages objects.

After implementation of the PhoneBook Automation Server 100, a user installs the PhoneBook Automation Server 100 along with the PhoneBook relational database 145, the OLE interface 110 and the ODBC interface 120 on the user's computer system. For this example, the user installs the PhoneBook Automation Server 100, the OLE interface 110 and the ODBC interface 120 on the user's workstation (client) 135 of the client/server network. The Name, Number and Business Directory database tables 420 forming the PhoneBook relational database 145 are installed on the user's server 140. Of note, when installing the PhoneBook Automation Server 100 on the user's workstation 135, the user enters the unique 128 by the Class ID (GUID) for the Book and Phone objects 215 and the path name for the PhoneBook Automation Server 100 containing these objects into the Registration Database.

After installing the above onto his/her computer system, the user writes and installs a new or merely installs a pre-written application program 130 capable of communicating with the OLE Interface 110 and designed to access data in the PhoneBook database 145. For this example, the application program 130 is referred to as the AutoDialer application program 130.

Though the AutoDialer application program 130 may be written with any language capable of communicating with the OLE Interface 110, for this example, it is written with Visual Basic. Further, the AutoDialer application program 130 has been designed to allow the user to store phone numbers along with the name of people and companies in a phone book, to access these phone numbers, and to dial a selected phone number with a modem connected to the user's workstation 135.

As should be clearly understood, the present invention is directed to creating a database centric object which may be used by an application program 130. Therefore, the above description of the invention and this illustrative example are not predicated to describe the implementation of such an application program 130 for use with a database centric object. Nonetheless, this illustrative example does include several exemplary Visual Basic commands to allow one of ordinary skill in the art to more easily implement an application program 130 for use with the database centric object created by the present invention.

Referring to FIG. 6, the following illustrates the creation of the database centric objects, the Book object and the YellowPages object, by the user. The process begins at step 601, where the AutoDialer application program 130 is selected by the user to run and is started. At step 610, the AutoDialer application program 130 then requests the OLE interface 110 to create the Book object.

The following Visual Basic commands are examples for implementing the AutoDialer application program as described for step 610. "Global Book as Object" is the command that declares the Book object as a global object, and "Set Book=CreateObject ("PHONEBK.Book")" is the command that requests the OLE interface 110 to create the Book object.

At step 620, the OLE interface 110 then accesses the Registration Database to determine whether the Book object is available on the user's system. If the Book object was not available in the Registration Database, then the OLE interface 110 would proceed to step 621 where it would return a "failed" signal to the AutoDialer application program 130. At step 699, the AutoDialer application program 130 would then notify the user of the failure. However, here, the Book object is located in the Registration Database, so the OLE interface 110 proceeds to step 625.

At step 625, the OLE interface 110 uses the Registration Database to determine the location (path name) of the PhoneBook Automation Server 100 for the Book object. If the OLE interface 110 was unable to locate the PhoneBook Automation Server 100 for the Book object, then the OLE interface would proceed to step 626 where it would return a "failed" signal to the AutoDialer application program 130. At step 699, the AutoDialer application program 130 would then notify the user of the failure. However, here, the PhoneBook Automation Server 100 for the Book object is located, and the OLE interface 110 proceeds to step 630.

At step 630, the OLE interface 110 loads the PhoneBook Automation Server 100 from storage into current memory. The OLE interface 110 then requests the PhoneBook Automation Server 100 to create the Book database centric object.

The PhoneBook Automation Server 100 then performs a series of initialization tasks. Specifically, at step 635, the Automation Server 100 creates the PhoneBook Application object 212 from the PhoneBook Application class. Further, at step 640, the PhoneBook Application object 212 creates the PhoneBook Database object 232 from the PhoneBook Database class. At step 645, the PhoneBook Database object 232 then opens a connection with the portion of the PhoneBook database 145 associated with the Name and Number database tables 420.

At step 650, the PhoneBook Database object 232 verifies that this connection with the PhoneBook database 145 has been opened. If the Database object 232 was unable to open a connection, then the PhoneBook Database object 232 would proceed to step 651. At step 651, the PhoneBook Database object 232 would return a "failed" signal to the OLE interface 110, which would forward the signal to the AutoDialer application program 130. At step 699, the AutoDialer application program 130 would then notify the user of the failure. However, here, the connection is opened by the PhoneBook Database object 232, so the PhoneBook Automation Server 100 proceeds to step 655.

At step 655, the PhoneBook Application object 212 of the PhoneBook Automation Server 100 continues the initialization process by creating a Book ClassFactory object 215 from the Book ClassFactory class for the Book database centric object. At step 660, the PhoneBook Application object 212 then requests the Book ClassFactory object 215 to register itself, by using the Class ID for the Book object, with the OLE interface 110. The PhoneBook Application object 212 of the PhoneBook Automation Server 100 then returns control to the OLE interface 110 at step 665.

At step 665, the OLE interface 110 requests the Book ClassFactory object 215 of the PhoneBook Automation Server 100 to create the Book Interface object 225 for the portion of the PhoneBook relational database 145 associated with the Name and Number database tables 420. The OLE interface 110 then returns control to the Book ClassFactory object of the PhoneBook Automation Server 100. The Book ClassFactory object 215 then creates the Book Interface object 225 from the Book Interface class for this particular portion of the PhoneBook database 145.

At step 670, the Book ClassFactory object determines whether the Book Interface object 225 was created. If the Book ClassFactory object 215 was unable to create the Book Interface object 225, then the Book ClassFactory object 215 would proceed to step 671. At step 671, the Book ClassFactory object 215 of the Automation Server 100 would then return a "failed" signal to the OLE interface 110, which would forward the signal to the AutoDialer application program 130. At step 699, the AutoDialer application program 130 would then notify the user of the failure. However, here, the Book ClassFactory successfully creates the Book Interface object 225, so the PhoneBook Automation Server 100 returns control to the OLE interface 110 at step 675.

At step 675, the OLE interface 110 obtains pointers to the methods and properties of the Book Interface object 225, and sends the VTABLE numbers corresponding to the pointers to the AutoDialer application program 130. At step 699, the AutoDialer application program 130 then returns control to the user and uses the VTABLE numbers for the Book Interface object 225 to allow the user to call methods and properties relating to the portion of the PhoneBook database 145 associated with the Name and Number database tables 420.

Referring to FIG. 8, the following illustrates how the Initialization Property/Method 310 of the Book Interface object 225 is used to perform an initial query, which enumerates an answer set from the Name and Number database tables 420 portion of the PhoneBook database 145. The process begins at step 801, where the AutoDialer application program 130 receives an "Initialize All" command from the user via the user's enduser workstation 135. At step 810, the AutoDialer application program then requests 130 the OLE interface 110 to use the "BOOL Query (short nQuery Id)" Initialization Method 310 of the Book Interface object 225 to perform the initial query. An example of a Visual Basic command for requesting the performance of an initial query of the Name and Numbers tables 420 portion of the PhoneBook database 145 is "BOOK.Query (1)".

At step 815, the OLE interface 110 verifies that the "BOOL Query (short nQueryId)" Initialization Method 310 for the Book Interface object 225 is available. If the "BOOL Query (short nQueryId)" Initialization Method 310 was not available, then the OLE interface 110 would proceed to step 816 where it would return a "failed" signal to the AutoDialer application program 130. At step 899, the AutoDialer application program 130 would then notify the user of the failure. However, here, the "BOOL Query (short nQueryId)" Initialization Method 310 of the Book Interface object 225 is available. Therefore, the OLE interface 110 requests the Book Interface object 225 of the PhoneBook Automation Server 100 to create the Name and Numbers Recordset objects 235 from the Name and Number recordset classes with the "BOOL Query (short nQueryId)" Initialization Method 310.

At step 820, the Book Interface object 225 uses the "BOOL Query (short nQueryId)" Initialization Method 310 to create the Name Recordset object 235, which is the master Recordset object 235, to get access to the fields in the Name database table 420. At step 825, the Book Interface object 225 then determines whether the Name Recordset object 235 was created.

If the Book Interface object 225 was unable to create Name Recordset object 235, then the Interface object 225 would proceed to step 826 where it would return a "failed" signal to the OLE interface 110, which would forward the signal to the AutoDialer application program 130. At step 899, the AutoDialer application program 130 would then notify the user of the failure. However, here, the Book Interface object 225 successfully creates the Name Recordset object 235, so the Book Interface object 225 proceeds to step 830. At step 830, the Book Interface object 225 then calls on the Name Recordset object 235 to perform the initial query on the records in the Name database table 420 using the Initialization Properties 310,if any, as the criteria for the query.

At step 835, the Book Interface object 225 uses the "BOOL Query (short nQueryId)" Initialization Method 310 to create the Number Recordset object 235, which is the slave Recordset object 235, to access the records with the "id" from the Number database table 420 corresponding to the "name_id" of the Name database table 420. At step 840, the Book Interface object 225 then determines whether the Number Recordset object 235 was created.

If the Book Interface object 225 was unable to create the Number Recordset object 235, then the Book Interface object 225 would proceed to step 841 where it would return a "failed" signal to the OLE interface, which would forward the signal to the AutoDialer application program 130. At step 899, the AutoDialer application program 130 would then notify the user of the failure.

However, here, the Book Interface object 225 successfully creates the Number Recordset object 235, so the Book Interface object 225 proceeds to step 845. At step 845, the Interface object 225 then calls on the Number Recordset object 235 to perform a query on all records with an "id" in the Number database table 420 corresponding to the "name_id" from the Name database table 420.

At step 850, the Book Interface object 225 then sets an Initialized flag to "true" to make all the other methods of the Book Interface object 225 available to the user. At step 855, the Book Interface object 225 returns a "successful" signal to the OLE interface 110, which forwards it to the AutoDialer application program 130. At step 899, the AutoDialer application program 130 then returns control to the user and displays the first record from the Name and Number database tables 420. The AutoDialer application program 130 also allows the user to further interact with the Name and Number database tables 420 via the other methods of the Book Interface object 225 of the PhoneBook Automation Server 100.

Figure 19:
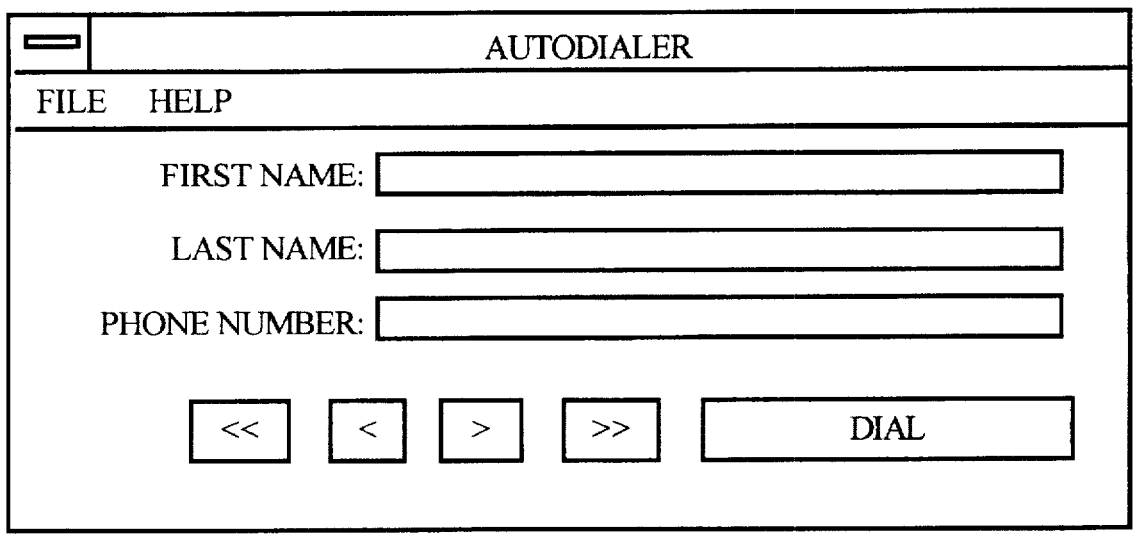
FIG. 19 depicts a computer screen displaying an illustrative example of an interface window implemented with an application program for allowing a user to perform many interfacing tasks with an object representative of a Phone Book database in a preferred embodiment of the present invention.
Figure 20:
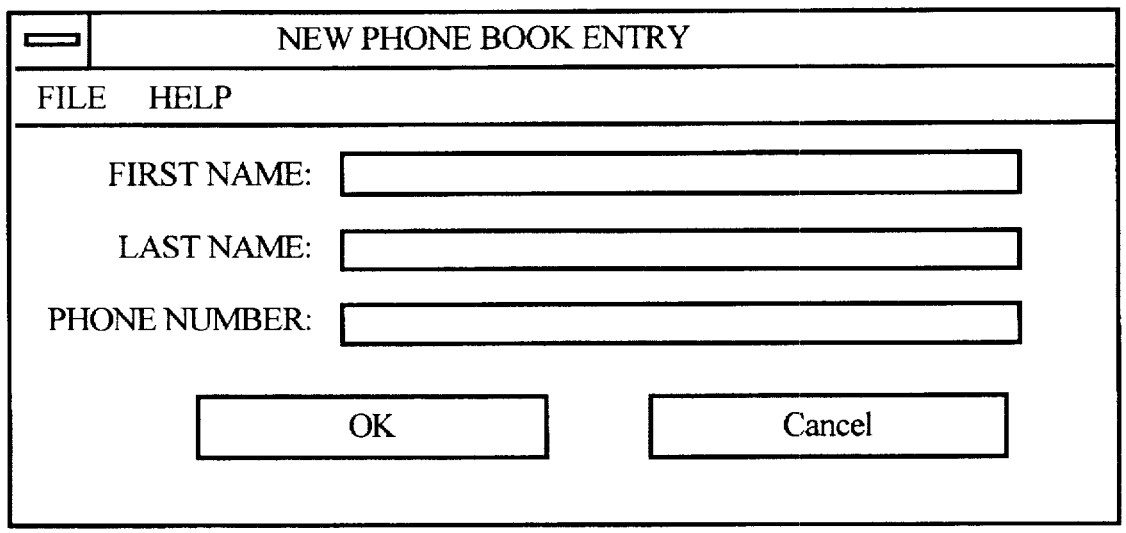
FIG. 20 depicts a computer screen displaying an illustrative example of an interface window implemented with an application program for allowing a user to input new data into a record of a Phone Book database represented by an object in a preferred embodiment of the present invention.

FIG. 19 is an illustrative example of a window interface which may be produced by the AutoDialer application program 130 and displayed on the user's enduser workstation 135 to allow the user to interact with the data stored in the Name and Number database tables 420. Examples of Visual Basic commands which would allow the AutoDialer application program 130 to fill in the boxes of the window interface are "FirstName.Text =Book.FirstName," "LastName.Text=Book.LastName" and "PhoneNumber.Text=Book.PhoneNumber". These commands would fill in the "First Name", "Last Name" and "Phone Number" boxes, respectively, with data from the Name and Number database tables 420.

The window interface allows the user to traverse the records of the answer set initially queried by the Initialization Method with an Enumeration Method of the Book Interface object 225. Referring to FIG. 9, the process begins at step 901, where the AutoDialer application program 130 receives, for example, a "Move to the Next record" command from a user. Specifically, the user selects the ">" button at the bottom of the window interface in order to scroll to the next record in the Name and Number database tables 420.

At step 910, the AutoDialer application program 130 then requests the OLE interface 110 to use the "BOOL MoveNext( )" Enumeration Method 320 of the Book Interface object 225. In doing so, the AutoDialer application program 130 passes the VTABLE number associated with the "BOOL MoveNext( )" Enumeration Method 320 to the OLE interface 110. An example of a Visual Basic command for implementing the "Move to the Next Record" command in the AutoDialer application program 130 is "Book. [MoveNext]", where the VTABLE number is passed through the "[MoveNext]" portion of the command.

At step 915, the OLE interface 110 then verifies that the "MoveNext( )" Enumeration Method 320 is available for the Book Interface object 225. If the "BOOL MoveNext" Enumeration Method 320 was not available, then the OLE interface 110 would proceed to step 916 where it would return a "failed" signal to the AutoDialer application program 130. At step 999, the AutoDialer application program 130 would then notify the user of the failure. However, here the "BOOL MoveNext( )" Enumeration Method 320 is available for the Book Interface object 225, so the OLE interface 110 requests the Book Interface object 225 of the PhoneBook Automation Server 100 to determine whether it has already been initialized.

At step 920, the Book Interface object 225 determines whether it is initialized by checking the Initialized flag. If the Initialized flag was set to "false," then the Book Interface object 225 would determine that it had not been initialized and would proceed to step 921. At step 921, the Book Interface object 225 would return a "failed" signal to the OLE interface 110, which would forward it to the AutoDialer application program 130. At step 999, the AutoDialer application program 130 would then notify the user of the failure. However, here, the Initialized flag is set to "true," so the Book Interface object 225 determines that it has been initialized and proceeds.

The Book Interface object 225 then uses the "BOOL MoveNext( )" Enumeration Method 320 to move to the next record of the answer set. At step 925, the Book Interface object 225 achieves this result by calling the "BOOL MoveNext( )" Enumeration Method 320 of the Name Recordset object 235. At step 930, the Book Interface object 225 then determines whether the "BOOL MoveNext( )" Enumeration Method 320 of the Name Recordset object 235 was called.

If the "BOOL MoveNext( )" Enumeration Method 320 was unable to be called, then the Book Interface object 225 would send a "failed" signal to the OLE interface 110, which would forward it to the AutoDialer application program 130. At step 999, the AutoDialer application program 130 would then notify the user of the failure. However, here, the "BOOL MoveNext( )" Enumeration Method 320 of the Name Recordset 235 object is successfully called and the "BOOL MoveNext( )" Enumeration Method 320 is successfully completed, so the Book Interface object 225 proceeds to step 935.

At step 935, the Book Interface object 225 calls the "BOOL MoveNext( )" Enumeration Method 320 of the Number Recordset object 235. At step 940, the Number Recordset object 235 is parameterized by using the "name_id" field of the Number table 420 and the "id" field of the Name table 420 to match records from the two database tables 420. The Book Interface object 225 then proceeds to step 945, where it requeries the Name Recordset object 235.

At step 950, the Book Interface object 225 determines whether the Number Recordset object 235 was requeried. If the requery had failed, then the Book Interface object 225 would send a "failed" signal to the OLE interface 110, which would forward it to the AutoDialer application program 130. At step 999, the AutoDialer application program 130, then would notify the user of the failure. However, here, the requery is successful and the "BOOL MoveNext( )" Enumeration Method 320 is successfully completed, so the Interface object sends a "successful" signal to the OLE interface 110.

The OLE interface 110 then forwards the "successful" signal to the AutoDialer application program 130. Finally, at step 999, the AutoDialer application program 130 uses the Access Properties/Methods 350 to obtain the the data corresponding to the next record of the Name and Number database tables 420.

In another example, the window interface allows the user to create a new record in the answer set initially queried by the Initialization Method with the Transaction Method 320 of the Book Interface object 225. In this example, the user selects the "File" Menu option. Though not shown, the "File" window Interface offers choices to create a new entry (record), delete the current entry (record) or edit the current entry (record). Here, the user selects the "create a new entry" option.

After selecting the "create a new entry" option, referring to FIG. 10, the process begins at step 1001. At step 1001, the AutoDialer application program 130 receives the "Create a New record" command from the user. At step 1010, the AutoDialer application program 130 then requests the OLE interface 110 to use the "BOOL New( )" Transaction Method 320 of the Book Interface object 225 to create a new record in the answer set as requested by the user.

In doing so, the AutoDialer application program 130 passes the VTABLE number associated with the "BOOL New( )" Transaction Method 330 to the OLE interface 110. An example of a Visual Basic command for implementing the "Create a New Record" command in the AutoDialer application program 130 is "Book.[New]", where the VTABLE number is passed through the "[New]" portion of the command. The data associated with the new record may then be passed with the "Book.FirstName=FirstName.Text", "Book.LastName=LastName.Text" and "Book.PhoneNumber=PhoneNumber.Text" Visual Basic commands.

At step 1015, the OLE interface 110 verifies that the "BOOL New( )" Transaction Method 330 in connection with adding the new record to the Name and Number database tables 420 is available for the Book Interface object 225. If the "BOOL New( )" Transaction Method 330 was not available, then the OLE interface 110 would proceed to step 1016 where it would return a "failed" signal to the AutoDialer application program 130. At step 1099, the AutoDialer application program 130 would then notify the user of the failure. However, here, the "BOOL New( )" Transaction Method 330 requested is available for the Book Interface object 225, so the OLE interface 110 requests the Book Interface object 225 of the PhoneBook Automation Server 100 to determine whether it has already been initialized.

At step 1020, the Book Interface object 225 determines whether it is initialized by checking the Initialized flag. If the Initialized flag was set to "false," then the Book Interface object 225 would determine that it had not been initialized and would proceed to step 1021. At step 1021, the Book Interface object 225 would return a "failed" signal to the OLE interface 110, which would forward it to the AutoDialer application program 130. At step 1099, the AutoDialer application program 130 would then notify the user of the failure. However, here, the Initialized flag is set to "true," so the Book Interface object 225 determines that it has been initialized and proceeds to create the new record of the answer set queried from the Name and Number database tables 420.

At step 1025, the Book Interface object 225 creates the new record of the answer set by calling the "BOOL New( )" Transaction Method 330 of the Name Recordset object 235 associated with the Book Interface object 225. At step 1030, the Interface object 225 determines whether the "BOOL New( )" Transaction Method 330 of the Name Recordset object 235 was called. If the "BOOL New( )" Transaction Method 330 was unable to be called, then the Book Interface object 225 would send a "failed" signal to the OLE interface 110, which would forward it to the AutoDialer application program 130. At step 1099, the AutoDialer application program 130 would then notify the user of the failure.

However, here, the "BOOL New( )" Transaction Method 330 of the Name Recordset 235 object is successfully called and the "BOOL New( )" Transaction Method 330 is successfully completed, so the Book Interface object 225 proceeds to step 1035.

At step 1035, the Book Interface object 225 calls the "BOOL New( )" Transaction Method 330 of the Number Recordset object 235 associated with the Book Interface object 225. At step 1040, the Book Interface object 225 determines whether the "BOOL New( )" Transaction Method 330 of the Number Recordset object 235 was called.

If the "BOOL New( )" Transaction Method 330 was unable to be called, then the Book Interface object 225 would send a "failed" signal to the OLE interface 110, which would forward it to the AutoDialer application program 130. At step 1099, the AutoDialer application program 130, would then notify the user of the failure. However, here, the "BOOL New( )" Transaction Method 330 of the Number Recordset 235 is successfully called and the "BOOL New( )" Transaction Method is successfully completed. Therefore, the new record is created in the Name and Number database tables 420, and an identical identifier is assigned in the "id" field and the "name_id" field of the tables, respectively.

The Book Interface object 225 then sends a "successful" signal to the OLE interface 110, and the OLE interface 110 then forwards the "successful" signal to the AutoDialer application program 130. Finally, at step 1099, the AutoDialer application program 130 returns control to the user and uses the Access Properties/Methods to allow a user to enter a first name, last name and phone number in the Name and Number database tables 420.

Here, the user enters the data into the "First Name" box, the "Last Name" box and the "Phone Number" box. The user then selects the "OK" button to "input" this new data into the newly created record of the Name and Number database tables 420.

Referring to FIG. 13, at step 1301, the AutoDialer application program 130 receives the "input" command from the user. At step 1310, the AutoDialer application program then requests the OLE interface to use the "SetFirstName( )," "SetLastName( )" and "SetPhoneNumber( )" methods of the Access Property Method 350 of the Book Interface object 225 to input the new data into the "first" and "last" fields of the Name database table 420 and the "number" field of the Number database table 420. An example of a Visual Basic command for sending the "First Name" data to the OLE interface is "Book.FirstName=Control.Text".

At step 1320, the OLE interface 110 verifies that the "SetFirstName( )", "SetLastName( )" and "SetPhoneNumber( )" Access Methods 350 and corresponding Access Properties 350 are available for the Book Interface object 225. If these Access Properties/Methods 350 were not available, then the OLE interface 110 would proceed to step 1321 where it would return a "failed" signal to the AutoDialer application program 130. At step 1399, the AutoDialer application program 130 would then notify the user of the failure. However, here, these Access Properties/Methods 350 of the Book Interface object 225 are available, so the OLE interface 110 requests the Book Interface object 225 to determine whether it 215 has already been initialized.

At step 1330, the Book Interface object 225 determines whether it has been initialized by checking the Initialized Flag. If the Initialized flag was set to "false," then the Book Interface object 225 would determine that it had not been initialized and would proceed to step 1331.

At step 1331, the Book Interface object 225 would return a "failed" signal to the OLE interface 110, which would forward it to the AutoDialer application program 130. At step 1399, the AutoDialer appliction program 130 would then notify the user of the failure. However, here, the Initialized flag is set to "true," so the Book Interface object 225 determines that it has been initialized and proceeds to steps 1340 and 1350.

At step 1340, the Book Interface object 225 uses the "SetFirstName( )", "SetLastName( )" and SetPhoneNumber( )" Access Methods 350 to input the requested data into the fields associated with the Access Properties 350. The Book Interface object 225 then returns control to the OLE interface 110, which returns control to the AutoDialer application program 130.

Finally, at step 1399, the AutoDialer application program 130 returns control to the user. Here, the AutoDialer application program 130 indicates to the user that the new data has been accepted.

Referring to FIG. 11, in another example, the window interface allows the user to use a Status Method 340 of the Book Interface object 225. The Status Method 340 allows the user to determine whether the records of the Name and Number database tables 420 of the PhoneBook database 145 in which the answer set has been queried by the Initialization Method may be edited.

The process begins at step 1101, where the AutoDialer application program 130 receives a "Editable?" command from the user. The "Editable?" command is entered in the window interface by using the "File" new option (not shown), in a similar way as that described above for the Transaction Method 330 example. At step 1110, the AutoDialer application program 130 then requests the OLE interface 110 to use the particular "BOOL CanUpdate( )" Status Method 340 to verify that the records of the Name and Number database tables 420 may be edited as requested by the user.

At step 1115, the OLE interface 110 verifies that the "BOOL CanUpdate( )" Status Method 340 is available for the Book interface object 225. If the "BOOL CanUpdate( )" Status Method 340 was not available, then the OLE interface 110 would proceed to step 1116 where it would return a "failed" signal to the AutoDialer application program 130. At step 1199, the AutoDialer application program 130 would then notify the user of the failure. However, here, the "BOOL CanUpdate( )" Status Method 340 is available for the Book Interface object 225, so the PhoneBook OLE interface 110 requests the Book Interface object 225 of the PhoneBook Automation Server 100 to determine whether it has already been initialized.

At step 1120, the Book Interface object 225 determines whether it has been initialized by checking the Initialized flag. If the Initialized flag was set to "false," then the Book Interface object 225 would determine that it had not been initialized and would proceed to step 1121. At step 1121, the Book Interface object 225 would return a "failed" signal to the OLE interface 110, which would forward it to the AutoDialer application program 130. At step 1199, the AutoDialer application program 130 would then notify the user of the failure. However, here the Initialized flag is set to "true," so the Book Interface object 225 determines that it has been initialized and proceeds to verify whether the records of the answer set queried from the Name and Numbers database tables 420 may be edited.

The Book Interface object uses the "BOOL CanUpdate( )" Status Method 340 to verify this capability of the Name and Numbers database table 420. At step 1125, the Book Interface object 225 achieves this result by calling the "BOOL CanUpdate( )" Status Method 340 of the Name Recordset object 235. At step 1130, the Book Interface object 225 then determines whether the "CanUpdate( )" Status Method 340 of the first Recordset object 235 was called.

If the Status Method 340 was unable to be called, then Book Interface object 225 would send a "failed" signal to the OLE Book interface 110, which would forward it to the AutoDialer application program 130. At step 1199, the AutoDialer application program 130 would then notify the user of the failure. However, here, the "BOOL CanUpdate( )" Status Method 340 of the Name Recordset object is successfully called and the "BOOL CanUpdate( )" Status Method 340 is successfully completed, so the Book Interface object 225 proceeds to step 1135.

At step 1135, the Book Interface object 225 calls the "BOOL CanUpdate( )" Status Method 340 of the Number Recordset object 235. At step 1140, the Book Interface object 225 then determines whether the "BOOL CanUpdate( )" Status Method 340 of the Number Recordset object 235 was called. If the "BOOL CanUpdate( )" Status Method 340 was unable to be called, then the Book Interface object 225 would send a "failed" signal to the OLE interface 110, which would forward it to the AutoDialer application program 130. At step 1199, the Autodialer application program 130, would then notify the user of the failure. However, here the "BOOL CanUpdate( )" Status Method 340 of the Number Recordset object 235 is successfully called and the "BOOL CanUpdate( )" Status Method 340 is successfully completed. Therefore, at step 1145, the Book Interface object 225 obtains a determination of whether the records may be edited.

For this example, the status determination is obtained by checking a Boolean value which results from ANDing the status values of both the Name and Number Recordset objects 235. Since the records of both the Name and the Number database tables 420 may edited, then both tables 420 have status values of "1". Therefore, when ANDed together, the status values return a Boolean value of "1", and the Book Interface object 225 determines that the records may be edited.

The Book Interface object 225 then forwards this determination to the OLE interface 110, which forwards the determination to the AutoDialer application program 130. Finally, at step 1199, the AutoDialer application program 130 returns control to the user and notifies the user that the records of the Name and Number database table 420 may be edited as requested by the user.

In another example, the user may use the Access Properties 350 of the Book Interface object 225 to obtain a phone number for a requested name from the Name and Number database tables 420. In doing so, referring to FIG. 19, the user selects the "File" Menu option of the window interface. Though not shown, the "File" window interface offers the user a choice to "obtain an is entry".

After the user selects the "obtain and entry" option, the AutoDialer application program 130 displays a "PhoneBook Entry" window interface (not shown), similar to the window interface in FIG. 19. This window interface allows the user to enter a first and last name to obtain the phone number for a particular individual from the answer set enumerated by the Initialization Method 310 from the Name and Number database tables 420.

After entering the name of the individual, the user selects the "OK" button. Referring to FIG. 12, the AutoDialer application program 130 then receives the command to obtain the particular record at step 1201. At step 1210, the AutoDialer application program 130 then requests the OLE interface 110 to use the "GetFirstName( )", "GetLastName( )" and "GetPhoneNumber( )" Access Methods 350 of the Book Interface object 225 to obtain the phone number for the particular individual from the Name and Number database tables 420. The particular individual's name is then stored as an Access Property 360 which as used as the criteria for obtaining the phone number from the tables 420. An example of a Visual Basic Command for requesting the OLE interface 110 to obtain the phone number for an individual with a particular last name is "Control.Text=Book.LastName."

At step 1220, the OLE interface 110 then verifies that the "GetFirstName( )", "GetLastName( )" and "GetPhoneNumber( )" Access Methods 350 and corresponding Access Properties 350 are available for the Book Interface object 225. If these Access Properties/Methods 350 were not available, then the OLE interface 110 would proceed to step 1221 where it would return a "failed" signal to the AutoDialer application program 130. At step 1299, the AutoDialer application program 130 would then notify the user of the failure. However, here, these Access Properties/Methods 350 of the Book Interface object 225 are available, so the OLE interface 110 requests the Book Interface object 225 to determine whether it has already been initialized.

At step 1230, the Book Interface object 225 then determines whether it has been initialized by checking the Initialized flag. If the Initialized flag was set to "false," then the Book Interface object 225 would determine that it had not been initialized and proceed to step 1231. At step 1231, the Book Interface object 225 would then return a "failed" signal to the OLE interface 110, which would forward it to the AutoDialer application program 130. At step 1299, the AutoDialer application program 130 would then notify the user of the failure. However, here, the Initialized flag is set to "true," so the Book Interface object 225 determines that it has been initialized.

The Book Interface object 225 then uses the "GetFirstName( 1s )", "GetLastName( )" and "GetPhoneNumber( )" Access Methods 350 to obtain the phone number for the individual with the requested name used as the Access Property 350. Next, the Book Interface object 225 returns a copy of the phone number to the OLE interface 100. The OLE interface 110 then forwards the phone number the AutoDialer application program 130.

Finally, at step 1299, the AutoDialer application program 130 returns control to the user and displays the phone number to the user along with the individual's name to the user in the window interface, as illustrated in FIG. 19. The user may then select the "Dial" option, and the Phone object will automatically dial the phone number via a modem connected to the user's enduser workstation 135.

In yet another illustrative example, the user may utilize the Operation Method 360 of the Book Interface object (the top level Interface object) 225 to access the records of the Business Directory database table 420 via the Yellow Pages Interface object (non-top level Interface object) 225. Referring to FIG. 19, the user may access this option by selecting the "File" Menu option of the window interface. The"File" window interface, though not shown, then offers the user a choice to access the "Business Directory".

Referring to FIG. 14, after the user selects the "Business Directory" option (not shown), at step 1401, the AutoDialer application program 130 receives the request. At step 1410, the AutoDialer application program 130 then requests the OLE interface 110 to use the "LPDISPATCH YellowPages( )" Operation Method 330 of the Book Interface object 225 to access the Yellow Pages Interface object 225 as requested by the user. An example of a Visual Basic for requesting access to the Business Directory database table 420 via the Yellow Pages Interface object 225 by way of the Book Interface object 225 is "YellowPages=Book.YellowPages".

At step 1415, the OLE interface 110 verifies that the Operation Method 360 is available for the Book Interface object 225. If the "LPDISPATCH YellowPages( )" Operation Method 360 was not available, then the OLE interface 110 would proceed to step 1416 where it would return a "failed" signal to the AutoDialer application program 130. At step 1499, the AutoDialer application program 130 would then notify the user of the failure. However, here, the "LPDISPATCH YellowPages( )" Operation Method 360 requested is available for the Book Interface object 225, so the OLE interface 110 requests the Book Interface object 225 of the PhoneBook Automation Server 100 to determine whether it has already been initialized.

At step 1420, the Book Interface object 225 determines whether it is initialized by checking the Initialized flag. If the Initialized flag was set to "false," then the Book Interface object 225 would determine that it had not been initialized and proceed to step 1421. At step 1421, the Book Interface object 225 would then return a "failed" signal to the OLE interface 110, which would forward it to the AutoDialer application program 130. At step 1499, the AutoDialer application program 130 would then notify the user of the failure. However, here, the Initialized flag is set to "true," so the Book Interface object determines that it has been initialized and proceeds to access the Yellow Pages Interface object 225.

At step 1425, the Book Interface object then uses the "LPDISPATCH YellowPages( )" Operation Method 360 to access the Yellow Pages Interface object 225 by creating the Yellow Pages Interface object 225. At step 1430, the Book Interface object 225 then determines whether the "LPDISPATCH YellowPages( )" Operation Method 360 created the Yellow Pages Interface object 225. If the "LPDISPATCH YellowPages( )" Operations Method 360 was unable to create the Yellow Pages Interface object 225, then the Book Interface object 225 would proceed to step 1431. At step 1431, the Book Interface object 225 would then send a "failed" signal to OLE interface 110, which would forward it to the AutoDialer Application program 130. At step 1499, the AutoDialer application program 130 would then notify the user of the failure. However, here, the "LPDISPATCH YellowPages( )" Operation Method 330 object successfully creates the Yellow Pages Interface object 225, so the Book Interface object 225 proceeds to step 1435.

At step 1435, the Book Interface object 225 calls the "GetIDispatch( )" method for the Yellow Pages Interface object 225 to obtain the Methods and Properties for the Yellow Pages Interface object 225. At step 1440, the Book Interface object 225 then determines whether the call to the "GetIDispatch( )" method for the Yellow Pages Interface object 225 was successful. If the call had failed, then the Book Interface object 225 would proceed to step 1441. At step 1441, the Book Interface object 225 would send a "failed" signal to the OLE interface 110, which would forward it to the AutoDialer application program 130. At step 1499, the AutoDialer application program 130, would then notify the user of the failure. However, here, the call is successful, so the Yellow Pages Interface object 225 proceeds a step 1445.

At step 1445 the Yellow Pages Interface object 225 then obtains pointers to the methods and properties of the Yellow Pages Interface object 225 and forwards them to the OLE Interface 110. The OLE interface 110 then forwards the VTABLE values of the methods and properties to the AutoDialer application program 130. Finally, at step 1499, the AutoDialer application program 130 returns control to the user and displays the fields of the Business Directory database table 420 in a window interface, not shown but similar to FIG. 19.

In future steps, in order to access the records of the Business Directory database table 420, the user must Initialize this table 420 to create the Business Directory Recordset object 235 as described above for FIG. 8. The user may then use the various methods and properties of the Yellow Pages Interface object 235 to interact with the records of the Business Directory database table 420.

What has been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the claimed invention, as defined by the claims below.

I claim:

1. In a computer system, an apparatus for interfacing an application program and a relational database including a plurality of tables, the apparatus comprising:

(a) a database centric object including a method, said method performing an operation on data within the tables of the relational database;

(b) means for receiving an object identifying signal from the application program;

(c) means for receiving a method identifying signal from the application program; and (d) means responsive to said object identifying and said method identifying signals for executing said operation on data within the relational database.

2. The apparatus of claim 1, wherein:

(a) said object further includes a property characteristic storage location for storing a property characteristic associated with said object;

(b) said method identifying signal further includes a property characteristic signal from the application program, wherein said property characteristics signal corresponds to said property characteristic and is stored in said property characteristic storage location; and (c) said executing means uses said stored property characteristic as a criteria to execute said operation of said method.

3. The apparatus of claim 1, wherein said object methods selected from the group consisting of:

i) a method for querying the relational database;

ii) a method for traversing records in the relational database;

iii) a method for creating a record in the relational database;

iv) a method for deleting a record in the relational database;

v) a method for editing a record in the relational database;

vi) a method for inputting data into a record of the relational database;

vii) a method for accessing data in a record of the relational database; and viii) a method for performing a status check on the database.

4. The apparatus of claim 1, further comprising:

(e) a means for interfacing said object and the relational database, wherein said interfacing means provides a standard interface for use by said method to perform the operation with one or more of a plurality of database formats.

5. The apparatus of claim 4, wherein said interfacing means comprises an ODBC interface.

6. The apparatus of claim 1, wherein said object further includes a method for opening and closing the database.

7. The apparatus of claim 1, wherein said object further includes an initial query method, wherein said initial query method is selected from the group consisting of:

i) a method for joining a plurality of tables in the database;

ii) a method for filtering records of the database; and iii) a method for parameterizing records of the database.

8. The apparatus of claim 1, wherein said object comprises an Automation Server.

9. The apparatus of claim 1, wherein said first receiving means comprises an OLE interface.

10. The apparatus of claim 1, wherein said second receiving means comprises an OLE interface.

11. In a computer system, an apparatus for interfacing an application program and a database, comprising:

(a) a database centric object including a method, said method performing an operation on data within the database; and (b) at least one application program interface (API) for providing a uniform interface between at least one application program and said object, wherein each application program performing operations on data within the database by calling said method of said object.

12. The apparatus of claim 11, wherein:

said object further includes a method for receiving a property characteristic associated with said object from the application program;

said object further includes a property characteristic storage location for storing said property characteristic; and said method means of said object uses said stored property characteristic as a criteria to perform the operation on data within the database.

13. The apparatus of claim 11, wherein said method is selected from the group consisting of:

i) a method for querying the database;

ii) a method for traversing records in the database;

iii) a method for creating a record in the database;

iv) a method for deleting a record in the database;

v) a method for editing a record in the database;

vi) a method for inputting data into a record of the database;

vii) a method for accessing data in a record of the database; and viii) a method for performing a status check on the database.

14. The apparatus of claim 11, further comprising:

(c) means for interfacing said object and the database, wherein said interfacing means provides a standard interface for use by said method to perform the operation with one or more of a plurality of database formats.

15. The apparatus of claim 11, wherein said interfacing means comprises an ODBC interface.

16. The apparatus of claim 11, wherein said object further includes a method for opening and closing the database.

17. The apparatus of claim 11, wherein said object further includes an initial query method, wherein said initial query method is selected from the group consisting of:

i) a method for joining a plurality of tables in the database;

ii) a method for filtering records of the database; and iii) a method for parameterizing records of the database.

18. The apparatus of claim 11, wherein said object comprises an Automation Server.

19. The apparatus of claim 11, wherein said object-oriented operating system comprises an OLE interface.

20. In a computer system, an apparatus for interfacing an application program and a database, comprising:

(a) a database centric object including a method, said method performing an operation on data within the database;

(b) means for storing a table of entries, wherein each of said entries associates an object identifier with said object;

(c) a first means for receiving a first signal from the application program, wherein said first signal corresponds to said object identifier;

(d) means for selecting said object associated with said object identifier in said table of entries, responsive to the receipt of said first signal;

(e) a second means for receiving a second signal from the application program, wherein said second signal corresponds to said method; and (f) means for executing, said operation on data within the database, responsive to the receipt of said second signal.

21. The apparatus of claim 20, wherein:

said object further includes a property characteristic storage location for storing a property characteristic associated with said object;

said second receiving means further receives a third signal from the application program, wherein said third signal corresponds to said property characteristic and is stored in said property characteristic storage location; and said executing means uses said stored property characteristic as a criteria to execute the operation of said method.

22. the apparatus of claim 20, wherein said storing means comprises an OLE interface.

23. In a computer system, an apparatus for interfacing an application program and a database, comprising:

(a) a database centric object including a method, said method performing an operation on data within the database;

(b) a first means for receiving a first signal from the application program, wherein said first signal corresponds to said object;

(c) means for storing a table of entries, wherein each said entries associates a method identifier with said object;

(d) a second means for receiving a second signal from the application program, wherein said second signal corresponds to said method identifier;

(e) means for selecting said method associated with said method identifier in said table of entries, responsive to the receipt of said second signal; and (f) means for executing said operation of said method on data within the database.

24. The apparatus of claim 23, wherein:

said object further includes a property characteristic storage location for storing a property characteristic associated with said object;

said second receiving means further receives a third signal from the application program, wherein said third signal corresponds to said property characteristic and is stored in said property characteristic storage location; and said executing means uses said stored property characteristic as a criteria to execute the operation of said method.

25. The apparatus of claim 23, wherein said storing means comprises an OLE interface.

26. In a computer system, a method for interfacing an application program and a database, comprising the steps of:

(a) receiving a first signal from the application program, said first signal corresponds to a database centric object, said object including a method for performing an operation on data within the database;

(b) receiving a second signal from the application program, wherein said second signal corresponds to said method; and (c) responding to said first and said second signals by executing the operation of said method on the database.

27. The method of claim 26, wherein:

said second signal further includes a property characteristic associated with said object; and step (b) further comprises the step of storing said property characteristic in a property characteristic storage location for use as a criteria for executing the operation in step (c).

28. The method of claim 26, wherein the operation of said method executed in step (c) is selected from the group consisting of:

i) querying the database;

ii) traversing records in the database;

iii) creating a record in the database;

iv) deleting a record in the database;

v) editing a record in the database;

vi) inputting data into a record of the database;

vii) accessing data in a record of the database; and viii) performing a status check on the database.

29. The method of claim 26, wherein step (c) further comprises the initial step of interfacing said object and the database to provide a standard interface for use by said method to perform the operation with one or more of a plurality of database formats.

30. The method of claim 26, further comprising the initial step of opening the database and the final step of closing the database.

31. The method of claim 26, further comprising the initial step selected from the group consisting of:

i) joining a plurality of tables in the database;

ii) filtering records of the database; and iii) parameterizing records of the database.

32. In a computer system, a method for interfacing an application program and a database, comprising the steps of:

(a) interfacing the application program with a database centric object including a method for performing an operation on the database;

(b) receiving a signal from the application program, wherein said signal corresponds to said method of said object; and (c) responding to said signal by executing said operation method on the database.

33. The method of claim 32, wherein:

said signal further includes a property characteristic associated with said object; and step (b) further comprises the step of storing said property characteristic in a property characteristic storage location for use as a criteria for executing the operation in step (c).

34. The apparatus of claim 32, wherein the operation of said method executed in step (c) is selected from the group consisting of:

i) querying the database;

ii) traversing records in the database;

iii) creating a record in the database;

iv) deleting a record in the database;

v) editing a record in the database;

vi) inputting data into a record of the database;

vii) accessing data in a record of the database; and viii) performing a status check on the database.

35. The method of claim 32, wherein step (c) further comprises the initial step of interfacing said object and the database to provide a standard interface for use by said method to perform the operations with one or more of a plurality of database formats.

36. The method of claim 32, further comprising the initial step of opening the database and the final step of closing the database.

37. The method of claim 32, further comprising the initial step selected from the group consisting of:

i) joining a plurality of tables in the database;

ii) filtering records of the database; and iii) parameterizing records of the database.

38. In a computer system, a method for interfacing an application program and a database, comprising the steps of:

(a) storing a table of entries, wherein each of said entries associates an object identifier with a database centric object including a method for performing an operation on data within the database;

(b) receiving a first signal from the application program, wherein said first signal corresponds to said object identifier;

(c) in response to said first signal, selecting said object associated with said object identifier in said table of entries;

(d) receiving a second signal from the application program, wherein said second signal corresponds to said method of said selected object; and (e) in response to said second signal, executing the operation of said method on the database.

39. The method of claim 38, wherein:

said second signal further includes a property characteristic associated with said object as part of said second signal; and step (d) further comprises the step of storing said property characteristic in a property characteristic storage location for use as a criteria for executing the operation in step (e).

40. In a computer system, a method for interfacing an application program and a database, comprising the steps of:

(a) receiving a first signal from the application program, wherein said first signal corresponds to a database centric object including a method for performing an operation on data within the database;

(b) storing a table of entries, wherein each of said entries associates a method identifier with said method of said object;

(c) receiving a second signal from the application program, wherein said second signal corresponds to said method identifier;

(d) in response to said second signal, selecting said method associated with said method identifier in said table of entries; and (e) executing the operation of said method on the database.

41. The method of claim 40, wherein:

said second signal includes receiving a property characteristic associated with said object as part of said second signal; and step (c) further comprises the step of storing said property characteristic in a property characteristic storage location for use as a criteria for executing the operation in step (e).

42. In a computer system, an apparatus for interfacing an application program and a relational database, comprising:

a relational database including a plurality of tables containing data;

object identifying means responsive to a command signal transmitted from an application program for identifying an object;

a self-contained object containing program code for at least one instruction that executes a specific operation on data within the tables of the relational database, the object further including:

(i) instruction identifying means responsive to the identified command signal transmitted from the application program for identifying the preprogrammed instruction to be executed;

(ii) means for executing the program code associated with the instruction identified by the instruction identifying means; and (iv) means for communicating a response to the application program.

43. The computer system of claim 42, wherein the object contains program code for a plurality of instructions that execute specific operations on data within tables of the relational database.

44. The computer system of claim 43, wherein the specific operations are identified by an integer quantity that is passed by the instruction invocation contained within the application program.

45. The computer system of claim 44, wherein the object identifying means is operative to identify the name of the object.

46. The computer system of claim 45, wherein the instruction identifying means is operative to identify the integer quantity passed in connection with the name of the object, to specifically identify the operation.

47. The computer system of claim 42, wherein the at least one instruction for executing a specific operation is selected from the group consisting of:

i) querying data with the relational database;

ii) traversing records in the database;

iii) creating a record in the database;

iv) deleting a record in the database;

v) editing a record in the database;

vi) inputting data into a record of the database;

vii) accessing data in a record of the database; and viii performing a status check on the database.

48. An interactive and interconnected computer system with a memory, an application program stored in the memory, and a relational database for storing data generated by the system, further comprising:

(a) an Automation server operatively disposed in the memory of the computer, said Automation server communicatively disposed to the application program;

(b) a plurality of Category classes operatively disposed to said Automation server, said Category classes each containing at least one object class; and (c) said object class creates and accesses database centric objects performing operations on data stored on the relational database thereby providing the application program access to the data contained within the relational database.

49. An interactive and interconnected computer system as recited in claim 48 wherein said Category classes comprise an Infrastructure category class, a Dispatch category class, and a Database category class.

50. An interactive and interconnected computer system as recited in claim 49 wherein said Infrastructure category class contains at least one object class for initializing and de-initializing said Automation server.

51. An interactive and interconnected computer system as recited in claim 49 wherein said Dispatch category contains at least one object class for accessing said database.

52. An interactive and interconnected computer system as recited in claim 49 wherein said Database category contains at least one object class connecting and communicating with said relational database.

* * * * *